(12) United States Patent
Khan et al.

(10) Patent No.: US 8,194,701 B2
(45) Date of Patent: Jun. 5, 2012

(54) SYSTEM AND/OR METHOD FOR DOWNSTREAM BIDDING

(75) Inventors: Shabbir Khan, San Jose, CA (US); Alexander Cohen, Mill Valley, CA (US)

(73) Assignee: Lippershy Celestial LLC, Las Vegas, NV (US)

( * ) Notice: Subject to any disclaimer, the term of this patent is extended or adjusted under 35 U.S.C. 154(b) by 1507 days.

(21) Appl. No.: 11/296,828

(22) Filed: Dec. 6, 2005

(65) Prior Publication Data
US 2007/0133553 A1    Jun. 14, 2007

(51) Int. Cl.
*H04J 3/16* (2006.01)
*G01R 31/08* (2006.01)
*H04L 12/28* (2006.01)

(52) U.S. Cl. ............... 370/469; 370/231; 370/395.2

(58) Field of Classification Search .......... 370/230, 370/231–232, 252, 351, 360, 389, 392, 395.2, 370/395.21, 469, 474–476; 709/227, 238, 709/239, 244
See application file for complete search history.

(56) References Cited

U.S. PATENT DOCUMENTS

| | | |
|---|---|---|
| 4,041,398 A | 8/1977 | Ellis |
| 4,339,807 A | 7/1982 | Uchimura et al. |
| 4,405,829 A | 9/1983 | Rivest et al. |
| 4,668,758 A | 5/1987 | Corley |
| 4,827,508 A | 5/1989 | Shear |
| 4,829,443 A | 5/1989 | Pintsov et al. |
| 4,868,758 A | 9/1989 | Kokubu |
| 4,885,777 A | 12/1989 | Takaragi et al. |
| 4,959,795 A | 9/1990 | Christensen et al. |
| 4,975,830 A | 12/1990 | Gerpheide et al. |
| 4,977,594 A | 12/1990 | Shear |
| 4,995,081 A | 2/1991 | Leighton et al. |
| 4,995,082 A | 2/1991 | Schnorr |
| 5,050,213 A | 9/1991 | Shear |
| 5,101,437 A | 3/1992 | Plamondon |
| 5,111,512 A | 5/1992 | Fan et al. |
| 5,195,133 A | 3/1993 | Kapp et al. |
| 5,202,930 A | 4/1993 | Livshitz et al. |
| 5,203,263 A | 4/1993 | Berger et al. |
| 5,222,138 A | 6/1993 | Balabon et al. |
| 5,280,527 A | 1/1994 | Gullman et al. |
| 5,337,358 A | 8/1994 | Axelrod et al. |
| 5,359,508 A | 10/1994 | Rossides |

(Continued)

FOREIGN PATENT DOCUMENTS
CN    1650578    8/2005
(Continued)

OTHER PUBLICATIONS
Search Report—Written Opinion issued Aug. 28, 2008 for PCT/US07/61697, 7 pages.
(Continued)

*Primary Examiner* — Kwang B Yao
*Assistant Examiner* — Redentor Pasia

(57) ABSTRACT

Digital objects may be transmitted to a destination via data networks. In particular, a node may facilitate bidding for the business of forwarding digital objects in a data transmission network. The node may receive a first bid request and generate a second bid request based on the first bid request. The second bid request may be transmitted to one or more intermediary nodes, and the node may receive one or more bids responsive to the second bid request. The node may subsequently receive and forward a digital object specified by the first bid request.

33 Claims, 8 Drawing Sheets

U.S. PATENT DOCUMENTS

| | | |
|---|---|---|
| 5,383,129 A | 1/1995 | Farrell |
| 5,386,369 A | 1/1995 | Christiano |
| 5,410,598 A | 4/1995 | Shear |
| 5,465,299 A | 11/1995 | Matsumoto et al. |
| 5,487,100 A | 1/1996 | Kane |
| 5,490,217 A | 2/1996 | Wang et al. |
| 5,557,320 A | 9/1996 | Krebs |
| 5,592,477 A | 1/1997 | Farris et al. |
| 5,677,905 A | 10/1997 | Bigham et al. |
| 5,719,942 A | 2/1998 | Aldred et al. |
| 5,727,156 A | 3/1998 | Herr-Hoyman et al. |
| 5,790,642 A | 8/1998 | Taylor et al. |
| 5,801,753 A | 9/1998 | Eyer et al. |
| 5,838,920 A | 11/1998 | Rosborough |
| 5,854,897 A | 12/1998 | Radziewicz et al. |
| 5,909,595 A | 6/1999 | Rosenthal et al. |
| 5,995,503 A | 11/1999 | Crawley et al. |
| 6,006,264 A | 12/1999 | Colby et al. |
| 6,044,075 A | 3/2000 | Le Boudec et al. |
| 6,047,313 A | 4/2000 | Hashimoto et al. |
| 6,073,176 A | 6/2000 | Baindur et al. |
| 6,073,716 A | 6/2000 | Ellertson et al. |
| 6,081,591 A | 6/2000 | Skoog |
| 6,134,589 A * | 10/2000 | Hultgren ............... 709/227 |
| 6,141,325 A | 10/2000 | Gerstel |
| 6,157,648 A | 12/2000 | Voit et al. |
| 6,163,807 A | 12/2000 | Hodgkinson et al. |
| 6,199,054 B1 | 3/2001 | Khan et al. |
| 6,289,371 B1 | 9/2001 | Kumpf et al. |
| 6,314,093 B1 | 11/2001 | Mann et al. |
| 6,366,575 B1 | 4/2002 | Barkan et al. |
| 6,400,681 B1 | 6/2002 | Bertin et al. |
| 6,400,687 B1 | 6/2002 | Davison et al. |
| 6,426,948 B1 | 7/2002 | Bowman-Amuah |
| 6,487,172 B1 | 11/2002 | Zonoun |
| 6,522,735 B1 | 2/2003 | Fortman et al. |
| 6,529,958 B1 * | 3/2003 | Oba et al. ............... 709/237 |
| 6,538,991 B1 | 3/2003 | Kodialam et al. |
| 6,563,793 B1 | 5/2003 | Golden et al. |
| 6,580,721 B1 | 6/2003 | Beshai |
| 6,631,132 B1 | 10/2003 | Sourani |
| 6,683,874 B1 | 1/2004 | Nagami et al. |
| 6,687,230 B1 | 2/2004 | Furutono et al. |
| 6,687,247 B1 | 2/2004 | Wilford et al. |
| 6,765,921 B1 | 7/2004 | Stacey et al. |
| 6,778,493 B1 | 8/2004 | Ishii |
| 6,901,445 B2 | 5/2005 | McCanne et al. |
| 6,947,390 B2 | 9/2005 | Hundscheidt et al. |
| 6,954,435 B2 | 10/2005 | Billhartz et al. |
| 6,970,939 B2 | 11/2005 | Sim |
| 6,973,057 B1 * | 12/2005 | Forslow ............... 370/328 |
| 6,975,594 B1 | 12/2005 | Byers |
| 6,977,930 B1 | 12/2005 | Epps et al. |
| 6,981,029 B1 | 12/2005 | Menditto et al. |
| 6,981,032 B2 | 12/2005 | Boivie et al. |
| 6,985,960 B2 | 1/2006 | Takashima et al. |
| 7,068,600 B2 | 6/2006 | Cain |
| 7,079,538 B2 | 7/2006 | Gazsi et al. |
| 7,162,539 B2 | 1/2007 | Garcie-Luna-Aceves |
| 7,164,665 B2 | 1/2007 | Tourunen |
| 7,177,832 B1 | 2/2007 | Semret et al. |
| 7,206,850 B2 * | 4/2007 | Ogawa ............... 709/229 |
| 7,212,975 B2 | 5/2007 | Bantz et al. |
| 7,260,598 B1 | 8/2007 | Liskov et al. |
| 7,269,185 B2 | 9/2007 | Kirkby et al. |
| 7,289,817 B2 | 10/2007 | Chun |
| 7,336,663 B2 | 2/2008 | Sakai |
| 7,415,268 B2 * | 8/2008 | Trossen ............... 455/406 |
| 7,418,518 B2 | 8/2008 | Grove et al. |
| 7,472,274 B2 | 12/2008 | Moreaux et al. |
| 7,526,646 B2 | 4/2009 | Fukuda et al. |
| 7,558,859 B2 | 7/2009 | Kasiolas et al. |
| 7,616,661 B2 | 11/2009 | Park et al. |
| 7,734,730 B2 | 6/2010 | McCanne |
| 2001/0025310 A1 | 9/2001 | Krishnamurthy et al. |
| 2001/0027449 A1 | 10/2001 | Wright |
| 2001/0029479 A1 | 10/2001 | Watanabe |
| 2001/0049730 A1 | 12/2001 | Brendes et al. |
| 2001/0053693 A1 | 12/2001 | Achour et al. |
| 2001/0053696 A1 | 12/2001 | Pillai et al. |
| 2002/0002602 A1 | 1/2002 | Vange et al. |
| 2002/0004843 A1 | 1/2002 | Andersson et al. |
| 2002/0015386 A1 | 2/2002 | Kajiwara |
| 2002/0059624 A1 | 5/2002 | Machida et al. |
| 2002/0059625 A1 | 5/2002 | Kurauchi |
| 2002/0064149 A1 | 5/2002 | Elliott et al. |
| 2002/0069179 A1 | 6/2002 | Slater et al. |
| 2002/0071389 A1 | 6/2002 | Seo |
| 2002/0124111 A1 | 9/2002 | Desai et al. |
| 2002/0150041 A1 | 10/2002 | Reinshmidt et al. |
| 2002/0180781 A1 | 12/2002 | Cezeaux et al. |
| 2002/0188562 A1 | 12/2002 | Igarashi et al. |
| 2002/0196461 A1 | 12/2002 | Hanna et al. |
| 2003/0005049 A1 | 1/2003 | Ogawa |
| 2003/0005148 A1 | 1/2003 | Mochizuki et al. |
| 2003/0016679 A1 | 1/2003 | Adams et al. |
| 2003/0018539 A1 | 1/2003 | La Poutre et al. |
| 2003/0036970 A1 | 2/2003 | Brustoloni |
| 2003/0059762 A1 | 3/2003 | Fujiwara et al. |
| 2003/0088529 A1 | 5/2003 | Klinker et al. |
| 2003/0093520 A1 | 5/2003 | Beesley |
| 2003/0105960 A1 | 6/2003 | Takatori et al. |
| 2003/0140144 A1 | 7/2003 | Raguram et al. |
| 2003/0147400 A1 | 8/2003 | Devi |
| 2003/0200439 A1 | 10/2003 | Moskowitz |
| 2003/0202469 A1 | 10/2003 | Cain |
| 2003/0210686 A1 | 11/2003 | Terrell et al. |
| 2003/0212827 A1 | 11/2003 | Saha et al. |
| 2004/0008689 A1 | 1/2004 | Westphal et al. |
| 2004/0019901 A1 | 1/2004 | Spio |
| 2004/0032856 A1 | 2/2004 | Sandstrom |
| 2004/0052259 A1 | 3/2004 | Garcia et al. |
| 2004/0064692 A1 | 4/2004 | Kahn et al. |
| 2004/0105446 A1 | 6/2004 | Park et al. |
| 2004/0111308 A1 | 6/2004 | Yakov |
| 2004/0114605 A1 | 6/2004 | Karaoguz et al. |
| 2004/0172373 A1 | 9/2004 | Chen |
| 2004/0192324 A1 | 9/2004 | Rudkin |
| 2004/0199472 A1 | 10/2004 | Dobbins |
| 2004/0213224 A1 | 10/2004 | Goudreau |
| 2004/0236957 A1 | 11/2004 | Durand et al. |
| 2004/0246372 A1 | 12/2004 | Megeid |
| 2004/0261116 A1 | 12/2004 | Mckeown et al. |
| 2005/0002354 A1 | 1/2005 | Kelly et al. |
| 2005/0037787 A1 | 2/2005 | Bachner et al. |
| 2005/0038707 A1 | 2/2005 | Roever et al. |
| 2005/0038724 A1 | 2/2005 | Roever et al. |
| 2005/0044016 A1 | 2/2005 | Irwin et al. |
| 2005/0135234 A1 | 6/2005 | Saleh et al. |
| 2005/0135379 A1 | 6/2005 | Callaway et al. |
| 2005/0152355 A1 | 7/2005 | Henriques |
| 2005/0152378 A1 | 7/2005 | Bango et al. |
| 2005/0169270 A1 | 8/2005 | Mutou et al. |
| 2005/0187968 A1 | 8/2005 | Dunning et al. |
| 2005/0193114 A1 | 9/2005 | Colby et al. |
| 2005/0195842 A1 | 9/2005 | Dowling |
| 2005/0197098 A1 | 9/2005 | Trossen |
| 2005/0201380 A1 | 9/2005 | Saleh et al. |
| 2005/0204042 A1 | 9/2005 | Banerjee et al. |
| 2005/0209927 A1 | 9/2005 | Aaltonen et al. |
| 2005/0234860 A1 | 10/2005 | Roever et al. |
| 2005/0246193 A1 | 11/2005 | Roever et al. |
| 2006/0002406 A1 | 1/2006 | Ishihara et al. |
| 2006/0059253 A1 | 3/2006 | Goodman et al. |
| 2006/0140162 A1 | 6/2006 | Vasa |
| 2006/0195565 A1 | 8/2006 | De-Poorter |
| 2007/0058568 A1 | 3/2007 | Previdi et al. |
| 2007/0061891 A1 | 3/2007 | Suzuki et al. |
| 2007/0127372 A1 | 6/2007 | Khan et al. |
| 2007/0130046 A1 | 6/2007 | Khan et al. |
| 2007/0133553 A1 | 6/2007 | Kahn et al. |
| 2007/0133570 A1 | 6/2007 | Khan et al. |
| 2007/0133571 A1 | 6/2007 | Kahn et al. |
| 2007/0133710 A1 | 6/2007 | Khan et al. |
| 2007/0136209 A1 | 6/2007 | Khan et al. |
| 2007/0192872 A1 | 8/2007 | Rhoads et al. |
| 2007/0291773 A1 | 12/2007 | Khan et al. |

FOREIGN PATENT DOCUMENTS

| | | |
|---|---|---|
| EP | 0915594 | 5/1999 |
| EP | 0982901 | 3/2000 |
| EP | 1187505 | 3/2002 |
| EP | 1513301 | 9/2005 |
| GB | 2399257 | 9/2004 |
| GB | 2411549 | 7/2007 |
| JP | 05-344135 | 12/1993 |
| JP | 2000-500308 | 1/2000 |
| JP | 2000-059377 | 2/2000 |
| JP | 2001-077856 | 3/2001 |
| JP | 2001-282619 | 10/2001 |
| JP | 2002-261800 | 9/2002 |
| JP | 2002-261805 | 9/2002 |
| JP | 2003-122726 | 4/2003 |
| JP | 2003-209568 | 7/2003 |
| JP | 2004-140486 | 5/2004 |
| JP | 2004-159296 | 6/2004 |
| JP | 2004-185263 | 7/2004 |
| JP | 2004-266547 | 9/2004 |
| JP | 2004-341929 | 12/2004 |
| JP | 2005-150955 | 6/2005 |
| JP | 2005-222523 | 8/2005 |
| KR | 2000-4564 | 1/2000 |
| KR | 2001-16690 | 3/2001 |
| KR | 2005-17108 | 2/2005 |
| WO | 9618939 | 6/1996 |
| WO | 98/58474 | 12/1998 |
| WO | 00/10357 | 2/2000 |
| WO | 00/45560 | 8/2000 |
| WO | 2004006486 | 1/2004 |
| WO | 2005-004518 | 1/2005 |
| WO | 2007/067911 | 6/2007 |
| WO | 2007/067913 | 6/2007 |
| WO | 2007/067915 | 6/2007 |
| WO | 2007/067917 | 6/2007 |
| WO | 2007/067930 | 6/2007 |
| WO | 2007/067933 | 6/2007 |
| WO | 2007/067934 | 6/2007 |
| WO | 2008/078149 | 7/2008 |

OTHER PUBLICATIONS

International Preliminary Report on Patentability issued Sep. 3, 2008 for PCT/US07/61697, 5 pages.
Search Report—Written Opinion issued Oct. 11, 2007 for PCT/US06/61701, 9 pages.
International Preliminary Report on Patentability issued Jun. 11, 2008 for PCT/US06/61701, 5 pages.
International Preliminary Report on Patentability issued Oct. 28, 2008 for PCT/US06/61660, 4 pages.
International Preliminary Report on Patentability issued Jun. 11, 2008 for PCT/US06/61702, 7 pages.
Search Report—Written Opinion issued Oct. 16, 2007 for PCT/US06/61650, 9 pages.
International Preliminary Report on Patentability issued Jun. 11, 2008 for PCT/US06/61650, 7 pages.
Search Report—Written Opinion Issued on Mar. 20, 2008 for PCT/US06/61653, 9 pages.
International Preliminary Report on Patentability issued Jul. 8, 2008 for PCT/US06/61653, 6 pages.
Search Report—Written Opinion issued on Nov. 15, 2007 for PCT/US06/61657, 7 pages.
International Preliminary Report on Patentability issued Jun. 11, 2008 for PCT/US06/61657, 5 pages.
Search Report—Written Opinion issued on Jul. 7, 2008 for PCT/IB06/004281, 9 pages.
International Preliminary Report on Patentability issued Jul. 29, 2008 for PCT/IB06/004281, 7 pages.
Search Report—Written Opinion issued on Aug. 8, 2008 PCT/US06/61660, 7 pages.
Office Action for U.S. Appl. No. 11/295,769 mailed Jan. 22, 2009, 12 pages.
Office Action for U.S. Appl. No. 11/296,819 mailed Dec. 11, 2008, 10 pages.
Office Action for U.S. Appl. No. 11/296,011 mailed Jun. 20, 2008, 12 pages.
Response to Office Action of Jun. 20, 2008 for U.S. Appl. No. 11/296,011 mailed Sep. 22, 2008, 13 pages.
Office Action for U.S. Appl. No. 11/296,011 mailed Dec. 16, 2008, 12 pages.
Office Action for U.S. Appl. No. 11/295,769 mailed Oct. 3, 2008, 9 pages.
Response to Office Action of Oct. 3, 2008 for U.S. Appl. No. 11/295,769 mailed Jan. 5, 2009, 20 pages.
Terms and conditions of the extended download warranty for digital products purchased on the Symantec Store, Jun. 27, 2005.
High Energy, by Tom Kaneshige, published on www.Line56.com on Oct. 17, 2001.
Multiprotocol Label Switching Architecture Memo, Copyright © The Internet Society (2001).
PCT Notification of Transmittal of the International Search Report and the Written Opinion of the International Searching Authority, or the Declaration, mailed Oct. 16, 2007, cited in PCT Application No. PCT/US06/61702.
International Search Report for Application No. PCT/US06/61659 dated Jul. 7, 2008, 3 pages.
International Search Report and Written Opinion for Application No. PCT/US06/61697 dated Aug. 28, 2008, 7 pages.
International Search Report and Written Opinion for Application No. PCT/US06/61650 dated Sep. 25, 2007, 9 pages.
Search Report and Written Opinion for Application No. PCT/US06/61659 dated Jul. 7, 2008, 7 pages.
Supplemental European Search Report and opinion for European Application No. 06846487, mailed Dec. 1, 2009, 7 pages.
International Search Report and Written Opinion for Application No. PCT/US06/61702 dated Oct. 16, 2007, 9 pages.
Knightson, et al., NGN Architecture: Generic Principles, Functional Architecture, and Implementation; Oct. 8, 2005; pp. 49-56.
Supplemental European Search Report and Opinion in European Application No. 06846507.9 dated Sep. 9, 2010.
Official Action in Japanese Application No. 2008-544643 dated Oct. 21, 2010. English Translation Available.
International Search Report and Written Opinion in Application No. PCT/US2006/061702 dated Oct. 16, 2007, 9 pages.
International Preliminary Report in Application No. PCT/US2006/061702 dated Jun. 19, 2008, 7 pages.
Official Action in Chinese Application No. 200680045997.6 issued Aug. 3, 2010, 7 pages. English Translation Available.
RFC 3031, 2001; IETF Networking Group, by E. Rosen et al.
Brett J. Vickers, et al., "Source-Adaptive Multilayered Multicast Algorithms for Real-Time Video Distribution," IEEE/ACM Transactions on Networking, vol. 8, No. 6, Dec. 2000, XP011038900, pp. 720-733.
Official Action in Korean Application No. 10-2008-7015497 issued Aug. 24, 2010. English Summary Available.
Pending Claims and Summary of Office Action in Chinese Application No. 200680045997.6 issued Nov. 28, 2011, 5 pages.

* cited by examiner

SYSTEM AND/OR METHOD FOR DOWNSTREAM BIDDING

BACKGROUND

1. Field

The subject matter disclosed herein relates to the transmission of digital objects in a data transmission network.

2. Information

Information exchange mechanisms using the Internet have been available for free for many services. To forward information from a source node to a destination node, one or more intermediary parties may forward the information over at least a portion of a path coupling the source node to the destination node. Such intermediary parties typically own, lease, control and/or operate equipment such as routers and/or the like for forwarding information according to a network protocol such as the Internet Protocol. The intermediary parties incur substantial costs in the deployment, maintenance and operation of equipment for the purpose of forwarding information to a destination node.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

DETAILED DESCRIPTION

Figure 1:
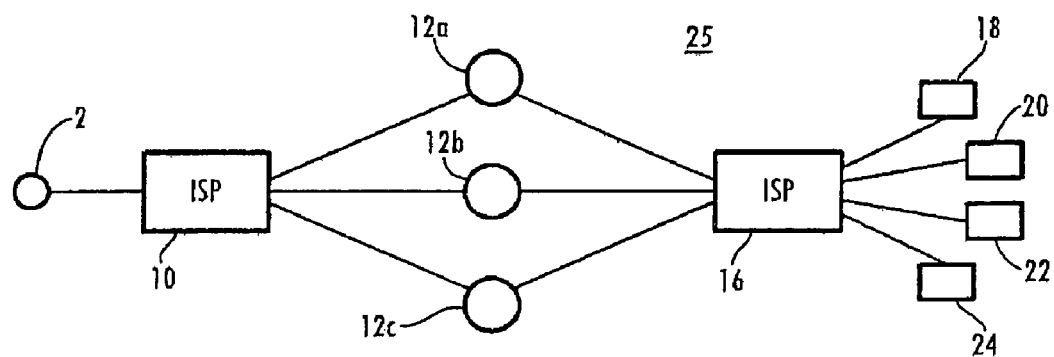
FIG. 1 is a schematic diagram of a data transmission network according to an embodiment.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

A "data transmission network" as referred to herein relates to infrastructure that is capable of transmitting data among nodes which are coupled to the data transmission network. For example, a data transmission network may comprise links capable of transmitting data between nodes according to one or more data transmission protocols. Such links may comprise one or more types of transmission media capable of transmitting information from a source to a destination. However, these are merely examples of a data transmission network and claimed subject matter is not limited in these respects.

In the transmission of data in a data transmission network, a "source node" may initiate transmission of data to one or more "destination nodes" coupled to the data transmission network. In one particular embodiment, although the claimed subject matter is not limited in this respect, a source node may initiate the transmission of data to the destination node based, at least in part, upon a destination address associated with the destination node. Here, according to a communication protocol of a particular embodiment, the source node may transmit data to the destination node in one or more "data packets" which are routed to the destination node through the data transmission network based, at least in part, on the destination address. However, these are merely examples of how data may be transmitted from a source node to a destination node in a data transmission network and claimed subject matter is not limited in these respects.

A node in a data transmission network may "forward" information to one or more other nodes in the data transmission network over data links. In one particular example, a first node may forward information to a second node by transmitting one or more data packets according to a communication protocol. Such data packets may comprise a header portion containing an address of an intended destination node and a payload containing forwarded information. If the second node is not the ultimate intended destination, the second node may also forward the data packets to a third node which comprises and/or is coupled to the ultimate intended destination node. However, these merely examples of how information may be forwarded in a data transmission network and claimed subject matter is not limited in these respects.

A "digital object" as referred to herein relates to information that is organized and/or formatted in a digitized form. For example, a digital object may comprise one or more documents, visual media and/or audio media, and/or combinations thereof. However, these are merely examples of the types of information that may be maintained in a digital object and claimed subject matter is not limited in this respect. Such a digital object may be maintained in a compressed format to enable efficient storage of the digital object in a storage medium and/or transmission of the digital in a data transmission network. In other embodiments, such a digital object may be encrypted for transmission in a secure communication channel. In one particular embodiment, although the claimed subject matter is not limited in this respect, a digital object may be formatted at a source node for transmission to one or more destination nodes. Also, a digital object may be transmitted to one or more destination nodes as one or more data packets routed to the one or more data nodes according to a communication protocol. However, these are merely examples of a digital object and claimed subject matter is not limited in these respects.

A "bid" as referred to herein relates to an expression of a proposal to perform a service. In one particular example, a customer and/or client may receive bids from more than one party competing for the business of the customer and/or client. A bid may specify terms under which a service may be performed such as, for example, price, quality, timeliness and/or reliability. However, these are merely examples of terms that may be expressed in a bid and claimed subject matter is not limited in this respect. Also, in some commercial contexts, acceptance of a bid by a customer and/or client may be binding on the parties. In other commercial contexts, however, acceptance of a bid by a customer and/or client, in and of itself, may not be binding. Here, additional actions by one or more parties may result in a binding arrangement. It should be understood that these are merely examples of a bid and claimed subject matter is not limited in this respect.

A "bid request" as referred to herein relates to an expression of an invitation to provide a bid for performing a service. In one particular example, such a bid request may specify a desired service to be performed by a service provider. In some embodiments, the bid request may specify some of the terms, but not necessarily all of the terms, under which a desired service is to be performed. However, these are merely examples of a bid request and claimed subject matter is not limited in these respects.

In response to receipt of a bid from a service provider for providing a service, a potential customer and/or client may provide an "acceptance message" to the bidding service provider. Such an acceptance message may express a willingness of the customer and/or client to receive services from the service provider according to at least some terms set forth in the received bid. However, this is merely an example of an acceptance message and the claimed subject matter is not limited in this respect.

According to an embodiment, two or more parties may exchange messages in the course of agreeing to terms under which a service may be provided according to a "negotiation protocol." In one particular embodiment, although claimed subject matter is not limited in this respect, a negotiation protocol may define how parties express a bid, bid request and/or acceptance message. In another embodiment, parties may exchange messages according to a negotiation protocol until a particular predefined state and/or event defining closure. Here, such a closure may define agreed terms under which a service is to be provided. It should be understood, however, that these are merely examples of a negotiation protocol and claimed subject matter is not limited in these respects.

In forwarding a digital object from a source node to a destination node over a data transmission network, equipment which is owned, leased, controlled and/or operated by one or more "intermediaries" or "intermediary parties" may forward at least a portion of the digital object over at least a portion of the data transmission network toward the destination node. As illustrated below, the term "intermediary" may refer to a party that may forward a digital object over at least a portion of the data transmission network and/or equipment that is owned, leased, controlled and/or operated by the party for performing this service.

Equipment that is owned, leased, controlled and/or maintained by an intermediary may comprise equipment that is capable of transmitting information to and/or receiving information a data transmission network. Here, such equipment may comprise one or more "communication ports" capable of receiving information from a source node and/or transmitting information to a destination node over one or more data transmission mediums forming links in the data transmission network. Such a communication port may be capable of transmitting and/or receiving information from any one of several types of data transmission media such as, for example, cabling (e.g., optical, coaxial, unshielded twisted wire pair cabling, etc.) and/or wireless transmission media (e.g., by terrestrial or satellite links). However, these are merely examples of a communication port that may couple equipment which is owned, leased controlled and/or operated by an intermediary to a data transmission network, and claimed subject matter is not limited in these respects.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. However, these are merely examples of a storage medium and claimed subject matter is not limited in these respects.

"Logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog and/or digital input signals. Such circuitry may be provided in an application specific integrated circuit (ASIC) or field programmable gate array (FPGA). Also, logic may comprise machine-readable instructions stored in a storage medium in combination with processing circuitry to execute such machine-readable instructions. However, these are merely examples of structures which may provide logic and claimed subject matter is not limited in this respect.

An "agent" as referred to herein relates to a process that executes on a first device and is capable of communicating with a second device over a data transmission network. In one particular embodiment, for example, an agent process may collect information associated with the first device and enable transmission of the collected information to the second device. In another embodiment, an agent may receive control signals from the second device to enable remote control of at least one aspect of the first device. However, these are merely examples of how an agent may enable communication between devices and the claimed subject matter is not limited in these respects. In another embodiment, an agent may execute on a processor under the control of machine-readable instructions stored on a storage medium. In another embodiment, an agent may be executed on different types of structure that provide logic. However, these are merely examples of an agent and claimed subject matter is not limited in these respects.

A "quality of service" ("QoS") as referred to herein relates to a characteristic of a data transmission service to provide data to a recipient within particular constraints. In particular examples, although claimed subject matter is not limited in this respect, QoS may refer to delivery of a service within expected bandwidth constraints, time constraints and/or error constraints. A quality of service may refer to a characteristic of a transmission control protocol/internet protocol (TCP/IP) type protocol, and/or a user datagram protocol/internet protocol (UDP/IP) type protocol. In one or more embodiments, a quality of service may refer to a threshold error transmission rate, for example where one or more data packets may not arrive, and/or where one or more data packets that do arrive may include one or more corrupted bits of information. In one or more embodiments, a quality of service may refer to where no errors and/or no error rate is acceptable, and/or to a threshold where the number of errors and/or the error rate may not exceed a predetermined value, and/or to a range within which a number of errors and/or an error rate may be acceptable, although the scope of claimed subject matter is not limited in this respect. In a particular embodiment, for example, a QoS may be associated with the transmission of a digital object from a source node to a destination node. Here, for example, a QoS may dictate that all or a portion of the digital object arrive at the destination node within a defined bandwidth limits, and/or within some time constraint, and/or with or without number of errors and/or within error rate limits. In another embodiment, a QoS may define, at least in part, an effective data rate at which a digital object is to be transmitted to the destination node. However, this is merely an example of how QoS may be applied in the transmission of a digital object and claimed subject matter is not limited in this respect.

Unless specifically stated otherwise, as apparent from the following discussion, it is appreciated that throughout this specification discussions utilizing terms such as "processing," "computing," "calculating," "selecting," "forming," "enabling," "inhibiting," "identifying," "initiating," "receiving," "transmitting," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Further, unless specifically stated otherwise, process described herein, with reference to flow diagrams or otherwise, may also be executed and/or controlled, in whole or in part, by such a computing platform.

FIG. 1 is a schematic diagram of a data transmission network 25 according to an embodiment. A source node 2 and destination nodes 18 through 24 may access data transmission network 25 using any one of several data transmission access technologies such as, for example, public switched telephone network (PSTN), digital subscriber line (DSL), coaxial/optical cable or wireless access (e.g., using satellite and/or terrestrial links). However, these are merely examples of how a node may obtain access to a data transmission network and claimed subject matter is not limited in these respects. Data transmission network 25 may be capable of transmitting data packets among nodes in a network topology according to an Internet Protocol (IP). However, this is merely an example of a communication protocol that may be used in transmission of all or portions of a digital object from a source node to a destination node and claimed subject matter is not limited in this respect. Here, in a particular embodiment illustrated in FIG. 1, source node 2 and destination nodes 18 through 24 may access data network 25 through the facilities of Internet service providers (ISPs) 10 and 16. For example, source node 2 and/or destination nodes 18 through 24 may comprise subscribers of corresponding ISPs that enable access to data transmission network 25 for a subscription fee. However, an ISP is merely an example of how a source and/or destination node may access a data transmission network and claimed subject matter is not limited in this respect.

According to an embodiment, source node 2 and/or destination nodes 18 through 24 may comprise any one of several types of devices which are capable of transmitting and/or receiving digital objects. In one particular example, source node and/or destination nodes 18 through 24 may comprise a communication port (not shown) that is adapted for transmitting data to and/or receiving data from an ISP through a data transmission medium using one or more of the aforementioned access technologies. In addition to communication ports, source node 2 and/or destination nodes 18 through 24 may also comprise a computing platform employing a processor, one or more memory devices and appropriate input/output devices for communicating between processes executing on the processor and communication ports. Here, such processes executing on a computing platform may be controlled, at least in part, by machine-readable instructions stored in one or more memory devices of the computing platform. In one particular embodiment, a computing platform at source node 2 may execute one or more processes to create and/or format a digital object for transmission on data transmission network 25. However, this is merely an example of how a source node 2 may create and/or format a digital object for transmission on a data transmission network and claimed subject matter is not limited in this respect. In another particular embodiment, a computing platform at a destination node may execute one or more processes to utilize a digital object received from data transmission network 25 through a communication port. However, this is merely an example of how a destination node may process a digital object received from a data transmission network and claimed subject matter is not limited in this respect.

According to an embodiment, equipment that is owned, leased, controlled and/or operated by intermediaries 12 may transmit digital objects between ISPs 10 and 16. Links coupling the intermediary equipment to ISPs 10 and 16 may comprise any one of several data transmission mediums such as, for example, cabling (e.g., fiber optic, coaxial and/or unshielded twisted wire pair cabling) and/or wireless transmission media (e.g., using terrestrial and/or satellite based links). However, these are merely examples of transmission media that may be used to transmit digital objects in a data transmission network and claimed subject matter is not limited in these respects.

As illustrated in FIG. 1, ISP 10 may transmit a digital object to ISP 16 in any one of multiple paths comprising at least one corresponding intermediary 12. Here, according to a particular embodiment, ISP 10 may transmit a digital object to ISP 16 through any one of the intermediaries 12a, 12b and/or 12c. As discussed below, according to a particular embodiment, source node 2 and/or ISP 10 may select a particular intermediary 12 to forward the digital object to the ISP 16 based, at least in part, upon one or more bids received from intermediaries 12a, 12b and/or 12c. However, this is merely an example of how an intermediary may be selected for forwarding a digital object and claimed subject matter is not limited in this respect.

According to an embodiment, although claimed subject matter in not limited in this respect, intermediaries 12 may route digital objects between ISPs 10 and 16 in one or more data packets formatted according to a particular network protocol such as an Internet Protocol (IP). Such data packets may be forwarded on data links connecting intermediaries 12 and ISPs according to any one of several data link layer protocols such as, for example, Ethernet, Asynchronous Transfer Mode (ATM), Frame Relay and/or Synchronous Optical NETwork/ Sychronous Digital Hierarchy (SONET/SDH) data link protocols. In embodiments employing wireless communication links, data packets may be forwarded on such wireless communication links according to any one of several satellite and/or terrestrial wireless data link protocols such as, for example, IEEE Stds. 802.11, and 802.16. However, these are merely examples of data link protocols that may be used to forward data packets in a data transmission network and claimed subject matter is not limited in this respect.

Figure 2:
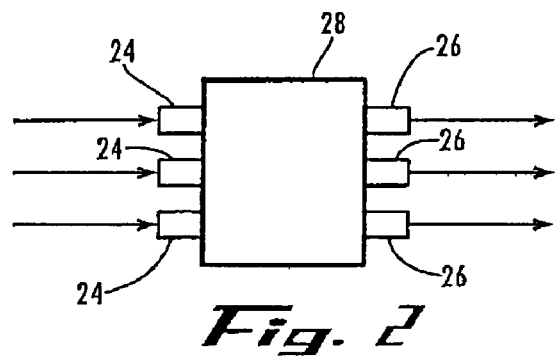
FIG. 2 is a schematic diagram of a router that may be owned, leased, controlled and/or operated by an intermediary for transmitting at least a portion of a digital object to a destination node according to an embodiment.

According to an embodiment, an intermediary 12 may comprise one or more routers for forwarding data packets originating at source node 2 to destination nodes. FIG. 2 is a schematic diagram of a router 28 which may be owned, leased and/or operated at an intermediary for transmitting at least a portion of a digital object to a destination node according to an embodiment. Router 28 may comprise one or more ingress communication ports 24 to receive data packet communications according to one or more of the aforementioned protocols. Here, one or more of ingress communication ports 24 may be capable of receiving all or a portion of a digital object from ISP 10 (and originating at source node 2). Router 28 may also comprise one or more egress communication ports 26 to transmit data packet communications according to one or more of the aforementioned protocols. Here, one or more of egress communication ports 26 may be capable of transmitting all or a portion of a digital object to ISP 16 (to then be forwarded to one or more destination nodes).

According to an embodiment, router 28 may comprise logic to determine how to forward packets received on ingress communication ports 24 to egress communication ports 26. For example, router 28 may determine an egress communication port 26 for forwarding a received data packet based, at least in part, on information associated with the received data packet such as, for example, a destination address. Here, according to a particular embodiment, router 28 may determine an egress port 26 for forwarding the received data packet according to one or more look up tables associating destination IP address with egress ports 26. However, this is merely an example of how a router may determine an egress port for forwarding a data packet and claimed subject matter is not limited in this respect. Notwithstanding the existence of a valid destination address associated with a received data packet, according to an embodiment, router 28 may also select whether or not to forward a received data packet based, at least in part, on information such as destination and/or source associated with the data packet, or other information associated with the data packet.

According to an embodiment, the aforementioned logic of router 28 to control routing data packets from an ingress communication port 24 to an egress communication port 26 may comprise one or more computing platforms comprising one or more processors and memory devices. The memory devices may comprise machine-readable instructions to execute on the one or more processors for controlling the routing of data packets. Alternatively, router 28 may comprise one or more ASIC devices to control routing, and/or combinations of one or more ASIC devices and one or more computing platforms to control routing. However, these are merely examples of logic that may be employed in a router for controlling forwarding of data packets and claimed subject matter is not limited in these respects.

According to an embodiment, an intermediary 12 (FIG. 1) may employ more than one router 28 to forward a digital object to a destination node. A digital object received from source node 2 at a first router may be forwarded to a second router where both first and second routers are owned, leased, controlled and/or operated by intermediary 12. Here, the first router may receive the digital object from the ISP 10 and forward the received digital object to the second router either directly to the second router or via one or more other routing devices. The second router may then forward to ISP 16 the digital object received from the first router. However, this is merely an example of how an intermediary may employ multiple routers for forwarding a digital object from a source node to a destination node, and claimed subject matter is not limited in this respect.

According to an embodiment, the intermediaries 12 and/or ISPs 10 and 16 may employ multiprotocol label switching (MPLS) according to the MPLS Architecture set forth in Internet Engineering Task Force (IETF), Network Working Group, RFC 3031, 2001. Here, ISP 10 may comprise a "label edge router" (LER) that is capable of assigning label values to packets received from source node 2 for transmission to a destination node. One or more routers of the intermediaries 12 may comprise a "label switch router" (LSR) to make forwarding decisions for received data packets based, at least in part, upon label values assigned to the received data packets. At a network hop between ISP 10 and ISP 16, an LSR associated with an intermediary 12 may strip off an existing label of a received data packet and apply a new label indicating how the next downstream LSR is to forward the data packet to a destination. LSRs coupled to forward a digital object from ISP 10 to ISP 16 may then form a Label Switch Path (LSP) determined, at least in part, according to labels (e.g., selected from a hierarchy of labels such as a label stack) assigned to data packets transporting a digital object at network hops between ISP 10 and ISP 16. However, this is merely an example of how a digital object may be transmitted between nodes on a data transmission network using MPLS and claimed subject matter is not limited in these respects.

Figure 3:
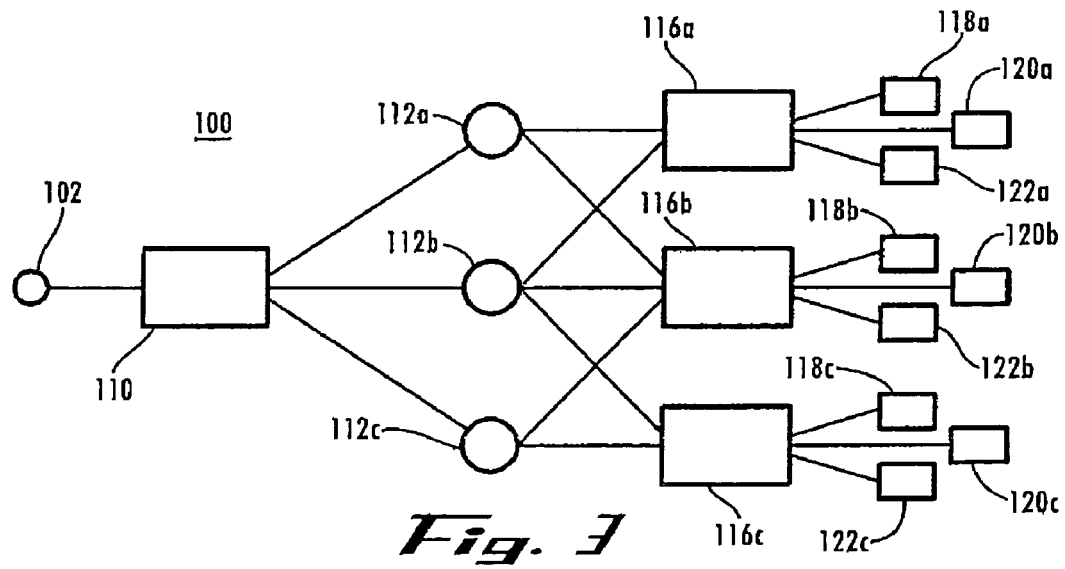
FIG. 3 is schematic diagram of a data transmission network for transmitting a digital object to two or more destination nodes according to an embodiment.

FIG. 3 is schematic diagram of a data transmission network 100 for transmitting a digital object to two or more destination nodes according to an embodiment. A source node 102 may transmit a digital object to more than one destination node coupled to one or more ISPs 116. Two or more intermediaries 112 may then be employed to forward the digital object to two or more destinations. According to an embodiment, a digital object formatted for transmission to a destination node may be copied at either the ISP 110 or an intermediary 112 for transmission to multiple destinations.

According to an embodiment, a digital object may be segmented and/or partitioned in to smaller sub-digital objects for transmission through two or more intermediaries. Here, in a particular embodiment, a sub-digital object may range in size from being as large as the larger digital object, as small as a null object containing no data, or of an intermediate size containing, for example, packet, sub-packet, aggregation of packets and/or an aggregation of bits forming the sub-digital object. According to an embodiment, although claimed subject matter is not limited in this respect, sub-digital objects forming a digital object may be independently transmitted through a data transmission network to a destination using the same or different paths. Subject to any QoS requirements, for example, intermediaries may bid for the service of forwarding individual sub-digital objects of a larger digital object as described herein. Here, for example, a digital object may be sufficiently large such that it may be desirable to split the digital object into one or more sub-digital objects, for example at source node and/or at one or more of intermediary nodes, where one or more of the sub-digital objects may be provided with its own individual routing requirements, quality of service, routing paths, and so on, and where the sub-digital objects may be reassembled at one or more of intermediary nodes and/or one or more of destination nodes. Such a sub-digital object concept in one or more embodiments may be analogous to data transfer utilizing packets, where the sub-digital objects may be at a higher level of organization that a packets, but may be at a lower level of organization that of a larger digital object. For example, a multimedia object may be split into a video sub-digital object and an audio sub-digital object, and/or a multimedia object may be split into a sub-digital objects corresponding to the scenes contained in the multimedia object, although the scope of claimed subject matter is not limited in this respect. An example of such a digital object that may be suitable for being split up into one may be where the digital object is a movie. In one or more embodiments, a transmission of such an object may include a multiple input, multiple output (MIMO) transmission system and/or a spatial division, multiple access system, for example where two or more sub-objects may be transmitted in parallel in two or more links. In one particular embodiment, a network that may be suitable for splitting a digital object into one or more sub-digital objects may comprise at least a portion of the network operating in compliance with an Institute of Electrical and Electronics Engineers (IEEE) 802.16 type standard such as a WiMax type standard, although the scope of claimed subject matter is not limited in this respect.

As in data transmission network 25 illustrated above, an intermediary 112 may comprise one or more routers (such as router 28, for example) to forward data packets to a destination node. Also, data transmission network 100 may employ MPLS and select particular intermediaries for forwarding a digital object to destinations.

In the particular embodiment shown in FIG. 3, a single intermediary 112b may be capable of forwarding a digital object from ISP 110 to destination nodes coupled to any of the ISPs 116a, 116b and/or 116c. On the other hand, neither intermediary 112a nor intermediary 112c may, by itself, be capable of forwarding a digital object to destination nodes coupled to all three ISPs 116a, 116b and 116c. To forward the digital object to destination nodes coupled to all three ISPs, the ISP 110 and/or source node 102 may select either the intermediary 112b, or intermediaries 112a and 112c.

According to embodiments of data transmission networks shown in FIG. 1 and/or FIG. 3, an intermediary may incur a cost for forwarding a digital object from in at least a portion of a data transmission network. To offset such a cost, an intermediary may receive compensation from a party associated with a source node, ISP and/or destination in exchange for forwarding a digital object over a portion of the network. According to an embodiment, an intermediary may provide a bid specifying terms under which the intermediary would forward a digital object over at least a portion of a data transmission network. A party that is to compensate an intermediary may select from among multiple bids for the business of forwarding the digital object over at least a portion of the network. However, this is merely an example embodiment and claimed subject matter is not limited in these respects.

According to an embodiment, any node such as intermediary nodes and/or ISP acting on behalf of another node such as source node, intermediary nodes, ISP and/or destination node 118, for example, may request transmission of a digital object. Likewise, a source node and/or destination node may together request and/or otherwise agree to transmit a digital object, for example as a result of a handshake between the source node and/or destination node, and/or between at least one of the source node and/or destination node, intermediary nodes, and/or one or more proxy nodes. In one or more embodiments, a handshake may refer to a challenge handshake authentication protocol (CHAP) type authentication between a network server and a client device, although the scope of claimed subject matter is not limited in this respect. A handshake may occur via direct communication between two or more nodes, and/or alternatively a handshake may occur via indirect communication between two or more nodes, for example using electronic mail or other suitable protocol. In one or more embodiments, a "proxy server" may refer to a server, node, and/or client device that may operate to provide, implement, process and/or intercept requests on behalf of given other server, node, and/or client device, and/or to operate interposed between a first server, node, and/or client device and second server, node, and/or other client device. Such a proxy sever may operate to provide, implement, process, and/or intercept a request on behalf of and/or in lieu of at least one of such a server, node, and/or client device, and/or may operate as an agent of at least one of such a server, node, and/or client device, and in one or more embodiments may appear to other servers, nodes, and/or client devices on a data transmission network as though it were in fact the server, node, and/or client device for which such a proxy may be acting as an agent thereof. Such a proxy server and/or an agent may be implemented on any one or more of a source node, source ISP, intermediary nodes, destination ISP, and/or destination nodes, and/or on other nodes on a data transmission network. In one or more embodiments, such a proxy server and/or agent may be utilized to implement one or more specialized functions as part of the overall process and/or processes for transmitting a digital object via a data transmission network. For example, if a digital object were a larger sized object that could be partitioned into one or more smaller sized sub-digital objects and/or packets for more efficient transmission, a proxy server dedicated to such partitioning of a digital object may be utilized. Other such specialized functions of a proxy server and/or agent may exist, for example compression, decompression, recombining, and so on. However, these are merely examples of how a proxy server and/or agent may operate on a data transmission network, and the scope of claimed subject matter is not limited in these respects.

Figure 4:
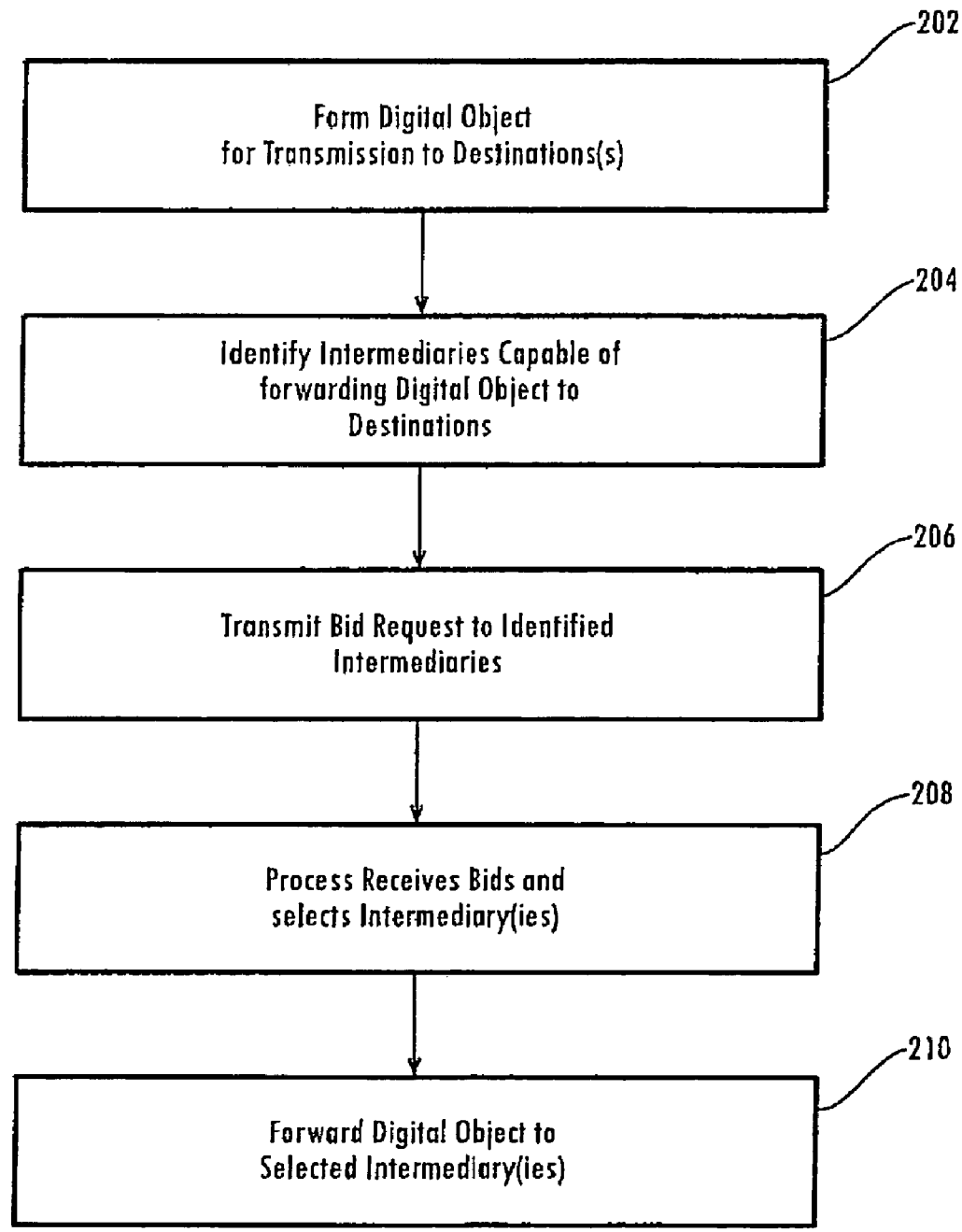
FIG. 4 is a flow diagram illustrating a process to initiate transmission of a digital object from a source node according to an embodiment.

FIG. 4 is a flow diagram illustrating a process 200 to initiate transmission of a digital object from a source node according to embodiments of data transmission networks 25 and 100. All or some portions of process 200 may be performed by logic at a source node. In one particular embodiment, as illustrated below, portions of process 200 may be performed at a proxy server (e.g., at an ISP or other unidentified node in a data transmission network) that is capable of communicating with a source node and one or more intermediaries. At block 202, a source node may form a digital object for transmission to one or more destination nodes. In a particular embodiment, a computer operator may form the digital object through interactions with a graphical user interface (GUI) of a computing platform associated with and/or coupled to the source node. However, this is merely an example of how a digital object may be formed and claimed subject matter is not limited in these respects. In one particular embodiment, the digital object may be formatted into one or more data packets according to a network protocol such as the IP protocol. As such, the one or more data packets may comprise a header portion with a destination IP address associated with a destination node. If the digital object is to be transmitted to more than one destination node, block 202 may format multiple sets of data packets for corresponding destination nodes with corresponding destination IP addresses. According to particular embodiments, although claimed subject matter is not limited in these respects, such multiple sets of data packets may be copied for transmission to corresponding multiple destination at a source node, ISP and/or intermediary. However, these are merely examples of where copies of data packets of digital object may be made for transmission to multiple destinations, and claimed subject matter is not limited in these respects.

A particular intermediary in a data transmission network may or may not be capable of transmitting a digital object to a destination node. In the particular embodiment of data transmission network 100 shown in FIG. 3, for example, there is no link connecting intermediary 112a with ISP 116c, and no link connecting intermediary 112c with ISP 116a. Accordingly, intermediary 112a may be deemed incapable of forwarding digital objects to destination nodes 118c, 120c and/or 122c. Likewise, intermediary 112c may be deemed incapable of forwarding digital objects to destination nodes 118a, 120a and 122a. In other embodiments, an intermediary may or may not be capable of forwarding a digital object to a destination based, at least in part, on other factors regardless of whether the intermediary is connected to a source and/or destination node by a link. Here, for example, such an intermediary node may be deemed incapable based, at least in part, on known equipment failures, inability to forward the digital object according to a desired QoS, and the like. However, these are merely examples of how and/or why an intermediary may be incapable of forwarding a digital object to destination and claimed subject matter is not limited in these respects.

At block 204 the source node and/or a proxy server may identify intermediaries that are capable of forwarding a digital object to one or more destination nodes. In one embodiment, a source node and/or proxy server may identify intermediaries that are capable of forwarding a digital object based, at least in part, on information in a database. Such a database may be maintained at a source node and/or proxy server and may identify particular intermediaries that are connected to the source node and capable of receiving digital object for forwarding. Such a database may also associate information with intermediaries such as, for example, capability to forward digital objects while achieving a certain QoS, operational status (e.g., functioning, down for maintenance, malfunctioning, etc.) and information indicative of destinations to which intermediaries may forward digital objects. However, this is merely an example of information that may be associated with intermediaries in a database for the purpose of identifying intermediaries which are capable of forwarding digital object to a destination and claimed subject matter is not limited in this respect.

At block 206, a source node and/or proxy server may initiate the transmission of bid requests to one or more intermediaries, requesting bids for a service of forwarding the digital object to one or more destination nodes. Here, a bid request may be transmitted through an in-band management channel of links that carry data packets of digital objects transmitted between a source and an intermediary. Alternatively, a bid request may be transmitted to the intermediary in a link that is separate from a link carrying digital objects. A source node and/or proxy server may transmit bid requests to intermediaries according to any one of several communication protocols. In one particular embodiment, for example, a source node and/or proxy server may transmit bid request in one or more data packets using a user datagram protocol/Internet protocol (UDP/IP). However, these are merely examples of how a source node and/or proxy server may transmit a bid request to one or more intermediaries and claimed subject matter is not limited in these respects.

According to an embodiment, a digital transmission form (DTF) may comprise metadata associated with a digital object that may be separately stored, represented and/or transmitted independently of the associated digital object. In particular embodiments, although claimed subject matter is not limited in this respect, DTFs associated with digital objects may be transmitted among nodes in a data transmission network (e.g., source node, ISPs and/or intermediaries) using the data paths used for transmitting the digital objects. In alternative embodiments, DTFs associated with digital objects may be transmitted among nodes in a data transmission using data paths that are distinct from data paths used for transmitting digital objects. However, these are merely examples of how DTFs may be transmitted among nodes in a data transmission network and claimed subject matter is not limited in these respects.

According to a particular embodiment, a bid request may be formatted as DTF that may be transmitted in one or more messages according to a negotiation protocol. Here, a DTF may comprise predefined fields that specify terms of a bid request for the service of transmitting a digital object to a destination node. Such predefined fields may be used for providing information to a bidding party such as, for example, size of the digital object to be transmitted (e.g., in bits, bytes, cells, packets, etc.), destination address(es), QoS, compression format, security, encryption, billing account number and/or the like. Alternatively, a DTF may comprise a reference to a pre-defined field definition schema and/or the schema itself, and/or the field values expressed in a format, e.g., XML. However, these are merely examples of predefined fields that may be used in DTF for providing a bid request and claimed subject matter is not limited in these respects.

As pointed out above, a DTF may facilitate a process of bidding for a service of forwarding an associated digital object to a destination. In addition to forwarding digital objects as consequence of bidding, in particular embodiments, although claimed subject matter is not limited in this respect, a data transmission network may permit the forwarding of other data traffic that does not require acceptance of a bid as a consequence of formation and/or transmission of a DTF. Here, for example, parties may have existing agreements and/or routes to forward traffic that obviates a need for bidding. However, this is merely an example of how a data transmission network may forward data traffic without the use of a DTF and claimed subject matter is not limited in this respect.

As discussed above, a source node may forward a digital object to more than one destination node. Also, as pointed out above, certain intermediaries may not be capable of forwarding a digital object to all intended destination nodes. Accordingly, in a particular embodiment, different bid request messages may be forwarded to different intermediaries based, at least in part, on known abilities of particular intermediaries in forwarding the digital object to particular destinations (e.g., as determined at block 204). Referring to the example of FIG. 3, according to a particular embodiment, source node 102 may format a digital object for transmission to destination nodes 118a, 118b and 118c. Intermediary 112a may receive one or more bid requests for forwarding the digital object to destination nodes 118a and 118b, but not for forwarding the digital object to destination node 118c. Likewise, intermediary 112c may receive one or more bid requests for forwarding the digital object to destination nodes 118b and 118c, but not for forwarding the digital object to destination node 118a.

In embodiments illustrated above, block 204 may identify one or more intermediaries that are capable of forwarding a digital object to a destination node. In alternative embodiments, however, block 206 may forward bid requests to any identifiable intermediary nodes, regardless of whether such intermediary nodes are determined to be capable of providing a desired service. This enables the intermediaries to determine for themselves as to whether they are capable forwarding the digital object to the destination under the terms of the bid. Accordingly, use of block 204 in identifying capable intermediaries is merely an optional embodiment, and claimed subject matter is not limit in these respects.

After a time period following transmission of bid requests to intermediaries at block 206, source node and/or proxy server may receive one or more bids from one or more intermediaries expressing an ability and/or willingness to forward a digital object to one or more destination according to terms set forth in the one or more received bids. Such terms in the bid may include, for example, price, QoS, expected delivery time and/or maximum latency. However, these are merely examples of terms that an intermediary may provide in a bid for the transmission of a digital object to one or more destination, and claimed subject matter is not limited in this respect.

Upon receipt of one or more bids from one or more intermediaries, a source node and/or proxy server may process received bids at block 208. Block 208 may select one or more intermediaries to forward the digital object to one or more destination nodes based, at least in part, on one or more received bids. In one particular embodiment, to forward a digital object to a particular destination node, block 208 may select an intermediary specifying a lowest price in its bid for this service. Alternatively, block 208 may select an intermediary specifying a lowest bid for a minimum specified QoS associated with forwarding the digital object to the destination node. In one particular embodiment, although claimed subject matter is not limited in this respect, acceptance and/or rejection of a bid, and/or termination of a biding process may be determined, at least in part, on a predetermined negotiation protocol. Here, for example, such a negotiation protocol may determine a format for bids, mechanisms to reject bids arriving late (e.g., after a timeout period), rejection of bids because a party soliciting a bid has pre-existing relationships with other intermediaries to provide a service of forwarding a digital object, and/or the like.

A negotiation protocol may also define multiple message types including, for example, bid requests, bids, acknowledgement of a bid request and/or bid, rejection and/or acceptance of a bid, broadcasting results of a bid request and subsequent bids, and/or changes for future bidding for the service of forwarding a digital object. However, these are merely examples of messages that may be defined as part of a negotiation protocol and claimed subject matter is not limited in these respects.

Upon selecting an intermediary to forward a digital object to a destination node, the source node and/or proxy server may initiate the selected intermediary to forward data packets carrying the digital object to one or more destination nodes. In a particular embodiment employing the aforementioned MPLS protocol, for example, the source node and/or proxy server may intiate a node in a data transmission network (e.g., source node or ISP connected to source node) to act as an LER. Here, such an LER may associate data packets carrying a digital object with a switch label identifying the digital object and how the digital object is to be processed by a recipient LSR. The LER may then forward data packets carrying the digital object to an ingress communication port of router acting as an LSR and which is owned, leased, controlled and/or operated by the selected intermediary. However, this is merely an example of how such a selected intermediary may be set to forward data packets carrying a digital object to a destination node and claimed subject matter is not limited in this respect.

Figure 5:
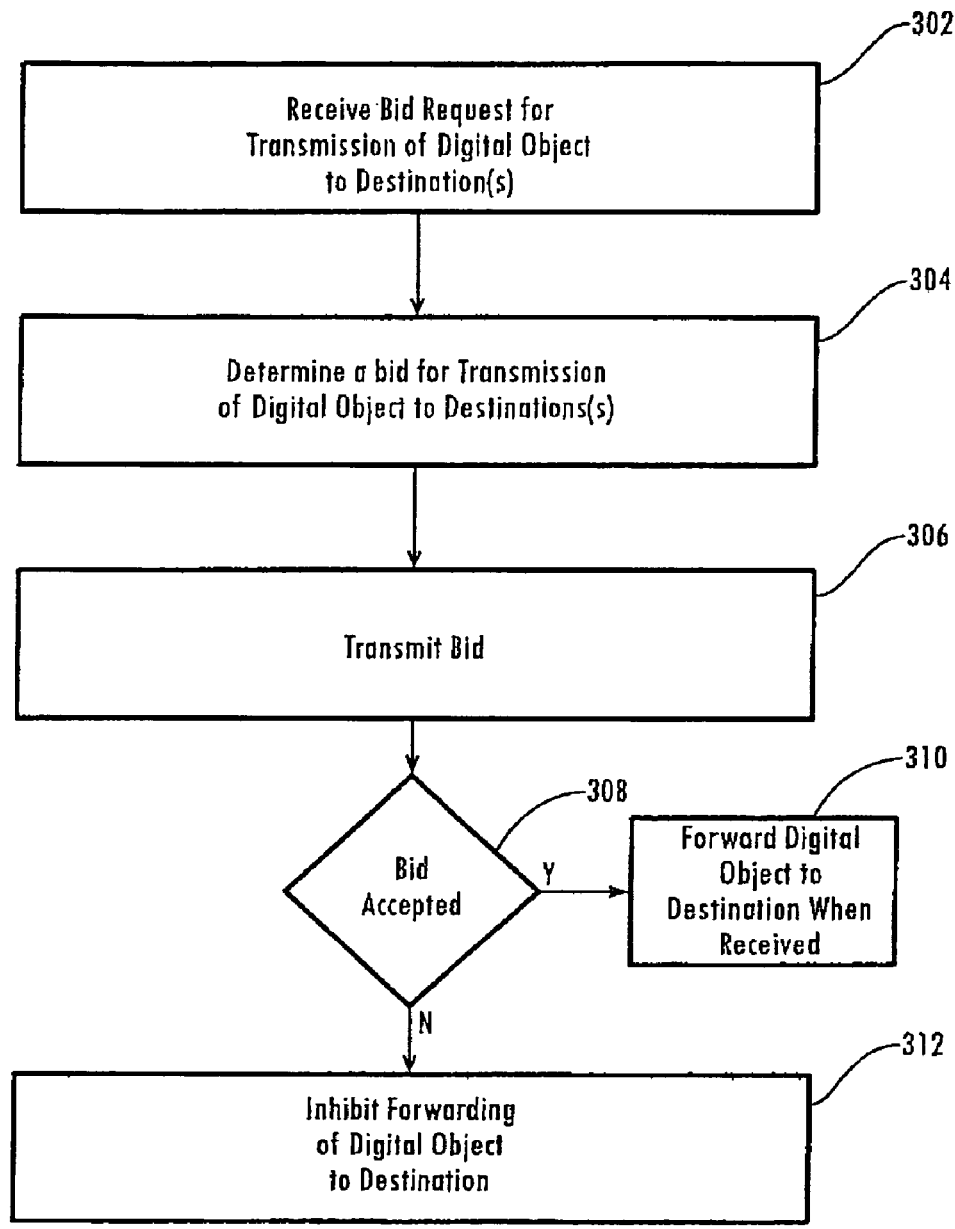
FIG. 5 is a flow diagram illustrating a process to act upon a bid request received at an intermediary according to an embodiment.

FIG. 5 is a flow diagram illustrating a process embodiment 300 to act upon a bid request received at an intermediary according to an embodiment. Process embodiment 300 may be executed by logic associated with an intermediary such as, for example, a computer system as illustrated above. However, this is merely an example of logic that is capable of executing a process to act upon a bid request and claimed subject matter is not limited in this respect. According to an embodiment, an intermediary may receive a message comprising a bid request (e.g., in the form of a DTF) at block 302. As described above, a bid request may be transmitted from a source node and/or proxy server according to a communication protocol using an in-band message transmitted in links for transmitting digital objects. As such, an intermediary may receive a bid request at an ingress communication port of a router that is capable of receiving data packets carrying digital objects from a source node. Alternatively, an intermediary may receive a bid request at a communication port that is coupled to a link of a different network that is dedicated for transmitting and/or receiving messages comprising bid requests, bids and/or other management messages. However, these are merely examples of how a bid request may be received at an intermediary and claimed subject matter is not limited in this respect.

Block 304 may determine terms for a bid for a service of forwarding a digital object to a destination node. As illustrated above, such a bid may specify terms and/or conditions under which an intermediary may agree to for the business of forwarding a digital object to a destination node. Block 304 may determine these terms and/or conditions based, at least in part, on capital equipment costs (e.g., for routers and related support equipment), operating costs (including, for example, asset maintenance, rent, power, personnel), current and/or predicted capacity, current and/or predicted asset utilization, prior experience and/or history, pre-existing contracts with other parties, vendor preference, anticipated bid behavior from competing intermediaries for the transmission of the digital object to the destination, anticipated demand and/or ability to provide a particular QoS for the transmission of the digital object. However, these are merely examples of information that an intermediary may utilize in determining terms for a bid for the transmission of a digital object to a destination node and claimed subject matter is not limited in this respect.

Following determining terms of a bid at block 304, an intermediary may transmit the bid to a source node and/or proxy server at block 306. Such a bid may be transmitted to a source node and/or proxy server through a communication port which is capable of receiving digital objects from the source node and/or transmitting digital objects to destinations in the data transmission network. Alternatively, such a bid may be transmitted in an out-of-band message in a different data link. However, these are merely examples of links that may be used for transmitting a message comprising a bid and claimed subject matter is not limited in these respects. In another embodiment, the message comprising a bid may be transmitted according to any one of several protocols such as, for example, UDP/IP and/or a proprietary protocol. However, this is merely an example of a communication protocol that may be used for the transmission of a bid to a source node and/or proxy server and claimed subject matter is not limited in this respect.

It should be understood that, according to a particular embodiment, an intermediary receiving a bid request at block 302 may choose not to respond to the bid request for any one of several reasons such as, for example, an inability to forward the digital object to a specified destination node and/or insufficient capacity to satisfy requested QoS service, a policy to not do business with this particular solicitor or class of solicitors and/or the like. Alternatively, an intermediary may transmit a message to a source node and/or proxy server indicating that the intermediary will not bid for the business of forwarding the digital object at issue. In another embodiment, an intermediary may also transmit a reason for not participating in the bidding process.

Following transmission of a bid at block 306, process 300 may wait for a response from a source node and/or proxy server indicating that the transmitted bid has either been accepted or rejected. Such an acceptance message from a source node and/or proxy server may take the form of a message transmitted in-band along with digital objects or as an out-of-band message in a separate network. In one embodiment, for example, diamond 308 may determine acceptance of a bid upon receipt of one or more data packets at an ingress communication port carrying at least a portion of the digital object and addressed to the destination node, providing an implied acceptance message. In an alternative embodiment, diamond 308 may determine a rejection of the bid if no such data packets carrying at least a portion of the digital object are received at an ingress communication port within a predetermined period following transmission of the bid at block 306. In another alternative embodiment, the diamond 308 may determine whether the bid is accepted or rejected based on an explicit acceptance message or rejection message received from an in-band and/or out-of-band data link. However, these are merely examples of how an intermediary may determine acceptance and/or rejection of a bid for a service of forwarding a digital object and claimed subject matter is not limited in these respects.

In response to an indication that a bid has been accepted, diamond 308 may enable forwarding a digital object to a destination node at block 310. According to an embodiment in which an intermediary comprises one or more routers capable of acting as LSRs in an MPLS network, for example, block 310 may enable one or more routers in an LSP to forward data packets to one or more destination nodes. Data packets identified as carrying the digital object based upon associated switch labels may be forwarded through the LSP toward the one or more destination nodes. According to an embodiment, the intermediary may receive data packets carrying a digital object at an ingress communication port of an initial router. Data packets carrying a digital object along an LSP (or possibly multiple LSPs for more than one destination node) may traverse one or more routers until being transmitted from an egress port of a final router toward the destination node. In an alternative embodiment, an Interior Gateway Protocol (IGP) may be used for routing traffic. However, these are merely examples of how an intermediary may enable forwarding of a digital object to a destination and claimed subject matter is not limited in these respects.

In response to an indication that a bid has been rejected, diamond 308 may inhibit forwarding a digital object to the destination node at block 312 if the bid is rejected. In one particular embodiment, for example, block 312 may inhibit forwarding data packets received at an ingress port of a router by, for example, dropping packets being received at an ingress port of a router without informing a sender. However, this is merely an example of how an intermediary may inhibit the forwarding of a digital object to a destination node and claimed subject matter is not limited in these respects.

As pointed out above, a bid request and/or related bid may relate to forwarding a digital object to multiple destination nodes. Here, in a particular embodiment, a source node and/or proxy server may accept a portion of a bid for forwarding a digital object to one destination node and reject a portion of the bid for forwarding the digital object to one or more other destination nodes. Accordingly, in this particular embodiment, diamond 308 may enable forwarding of a digital object to some destination nodes (relating to an accepted portion of a bid) and inhibit forwarding of the digital object to other destination nodes (relating to a rejected portion of the bid). However, this is merely an example of how an intermediary may process a partial acceptance of a bid for a service of forwarding a digital object and claimed subject matter is not limited in these respects.

Figure 6:
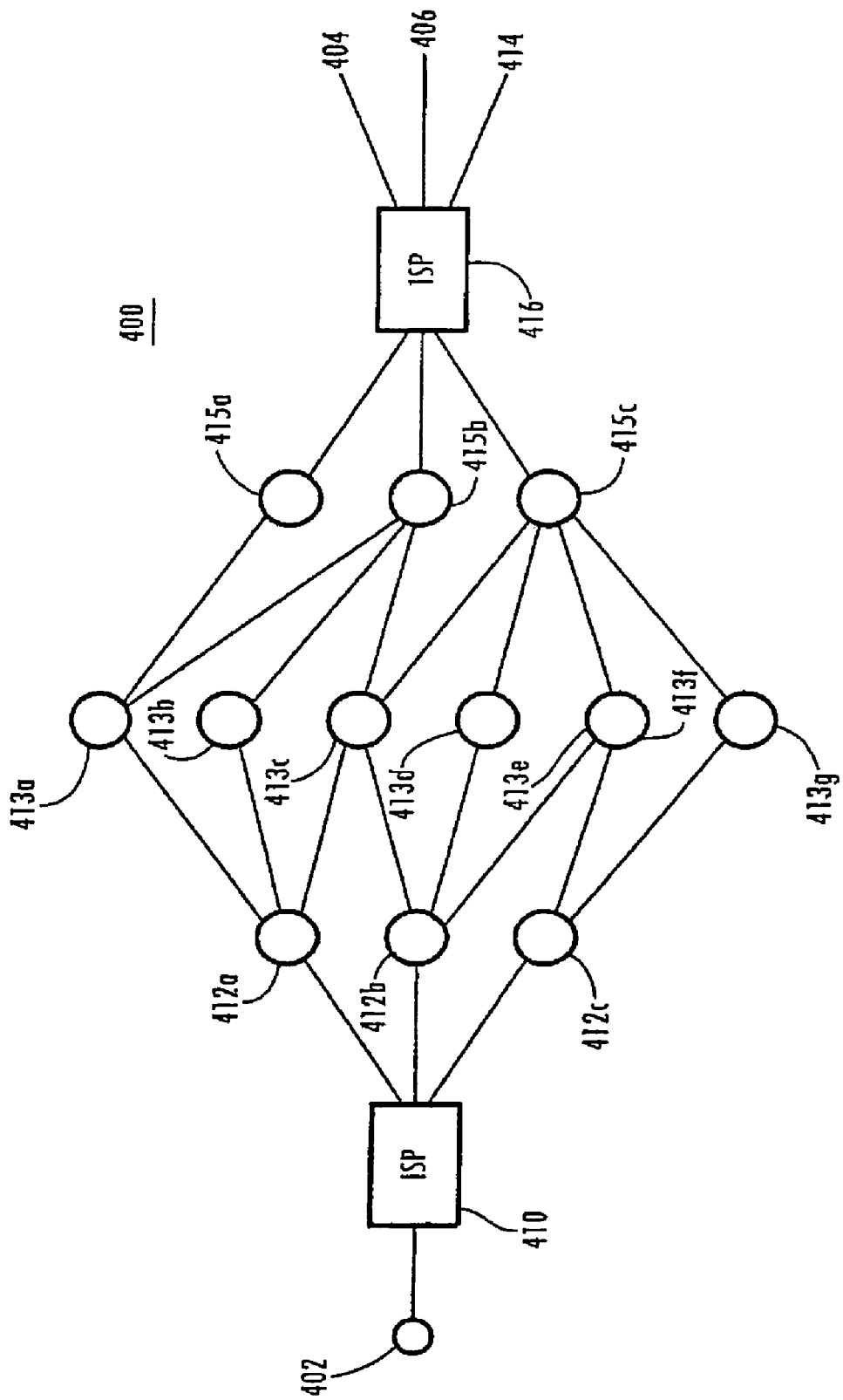
FIG. 6 is a schematic diagram of a data transmission network for transmitting a digital object from a source node to a destination node through two or more intermediaries.

FIG. 6 is a schematic diagram of a data transmission network 400 for transmitting a digital object from a source node to one or more destination nodes through two or more intermediaries. A source node 402, coupled to data transmission network 400 through ISP 410, may desire forwarding a digital object to a destination node coupled to ISP 416. ISP 410 may forward a digital object to intermediaries 412a, 412b and/or 412c without any intervening network hops. However, intermediaries 412a, 412b and/or 412c may not necessarily be capable of forwarding a digital object to a destination node without assistance of one or more downstream intermediaries. Here, no single intermediary 412a, 412b and/or 412c may necessarily be capable of forwarding a digital object to ISP 416 without forwarding the digital object through at least one downstream intermediary 413a, 413b, 413c, 413d, 413e, 413f and/or 413g. Likewise, no single intermediary 413a, 413b, 413c, 413d, 413e, 413f and/or 413g may be capable of forwarding a digital object to ISP 416 without routing the digital object through an intermediary 415a, 415b and/or 415c.

In response to a request for a bid for the service of forwarding a digital object from ISP 410 to a destination node 404, 406 and/or 408, according to a particular embodiment, an intermediary 412a, 412b and/or 412c may provide a bid comprising terms which are based, at least in part, upon a cost associated with forwarding the digital object through one of downstream intermediaries 413a through g. While executing process 300 (FIG. 5), according to a particular embodiment for responding to the request for a bid, at block 304 an intermediary 412a, 412b and/or 412c may transmit a bid request to one or more downstream intermediaries 413a through g. Upon receiving bids from one or more of downstream intermediaries, intermediary 412a, 412b and/or 412c may determine terms for a bid for the transmission of the digital object received from the ISP 410 based, at least in part, on terms from one or more bids received from one or more downstream intermediaries. Intermediary 412a, 412b and/or 412 may then complete process 300 as illustrated above. In determining bids in response to bid requests from intermediaries 412a, 412b and/or 412c, intermediaries 413a through g may similarly request bids of and/or receive bids from downstream intermediaries 415a, 415b and/or 415c as illustrated above.

Figure 7:
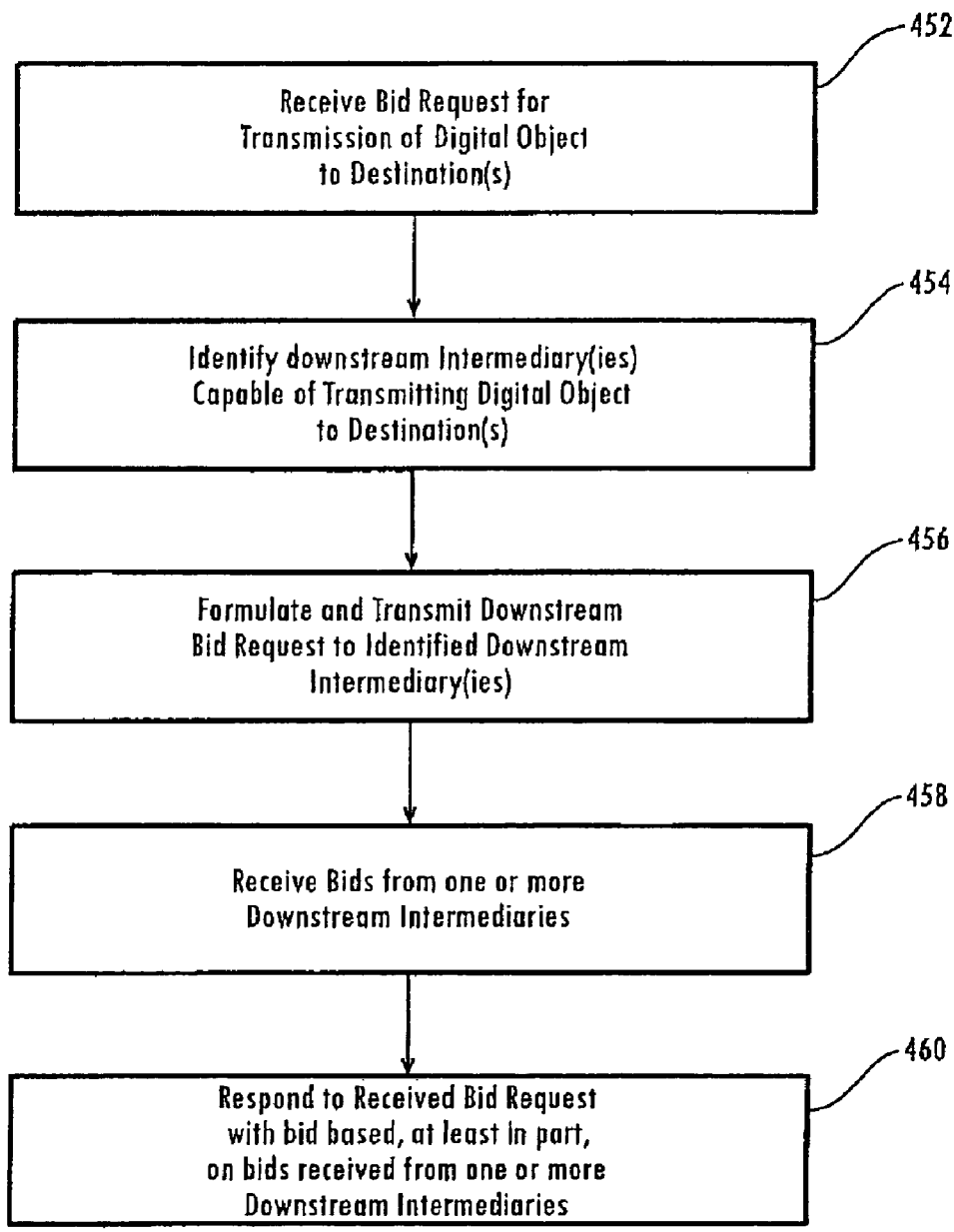
FIG. 7 is a flow diagram illustrating a process to act upon a bid request received at an intermediary according to an embodiment.

FIG. 7 is a flow diagram illustrating a process embodiment 450 to act upon a bid request received at an intermediary according to an embodiment. According to particular embodiment, process embodiment 450 may be executed by one or more of intermediaries 412 in response to a bid request from a source node and/or proxy server. In another embodiment, process embodiment 450 may be executed by one or more of the downstream intermediaries 413 in response to a bid request from an intermediary 412. At block 452, an intermediary may receive a bid request as illustrated above with reference to block 302 of FIG. 5. In the case of receiving a bid request at a downstream intermediary 413, however, it should be understood that such a bid request may originate from an intermediary 412. Block 454 may identify one or more downstream intermediaries capable of transmitting the digital object to the destination node as illustrated above with reference to block 204 of process 200.

Block 456 may formulate and transmit a downstream bid request to downstream intermediaries identified in block 454. The terms set forth in such a bid request may be based, at least in part, upon terms set forth in one or more bid requests received at block 452. In a particular embodiment, for example, a bid request formulated at block 456 may characterize a digital object, specify one or more destination nodes and indicate how the digital object is to be transmitted to the one or more destination nodes as described above with reference to block 206 in FIG. 4. Bid requests formulated at block 456 may then be transmitted to one or more downstream intermediaries as an in-band and/or out-of-band message as illustrated above with reference to block 206 above.

At block 458, an intermediary may receive one or more bids in response to bid requests transmitted at block 456. Such bids received at block 458 may express terms such as those expressed in bids received at block 208 as illustrated above. Here, process embodiment 450 may wait for responses following transmission of the bid requests at block 456 for a predetermined period following a transmission of one or more bid requests. Then, block 460 may determine terms for one or more bids to respond to the bid request received at block 452. Terms set forth in these bids may be based, at least in part, upon terms set forth in one or more bids received at block 456. Here, for example, block 460 may determine a price associated with a bid responsive to the bid request received at block 452 based, at least in part, a cost associated with one or more of the bids received at block 458. However, these are merely examples of how terms of a bid for a service of transmitting a digital object to a destination may be determined and claimed subject matter is not limited in this respect.

The discussion above illustrates a process by which intermediaries may bid for the business of providing a service of forwarding digital objects to destination nodes. In particular embodiments, a data transmission network may transport digital objects in data packets over links connecting a source node and/or ISP with intermediaries, and connecting intermediaries with destination nodes. In additional embodiments, a separate network, apart from a data transmission network used for forwarding digital objects, may facilitate an exchange of management messages such as, for example, bid requests, bids, and their status. This may enable centralized deployment of the activities of bidding and billing for the services of forwarding digital objects over the data transmission network.

Figure 8:
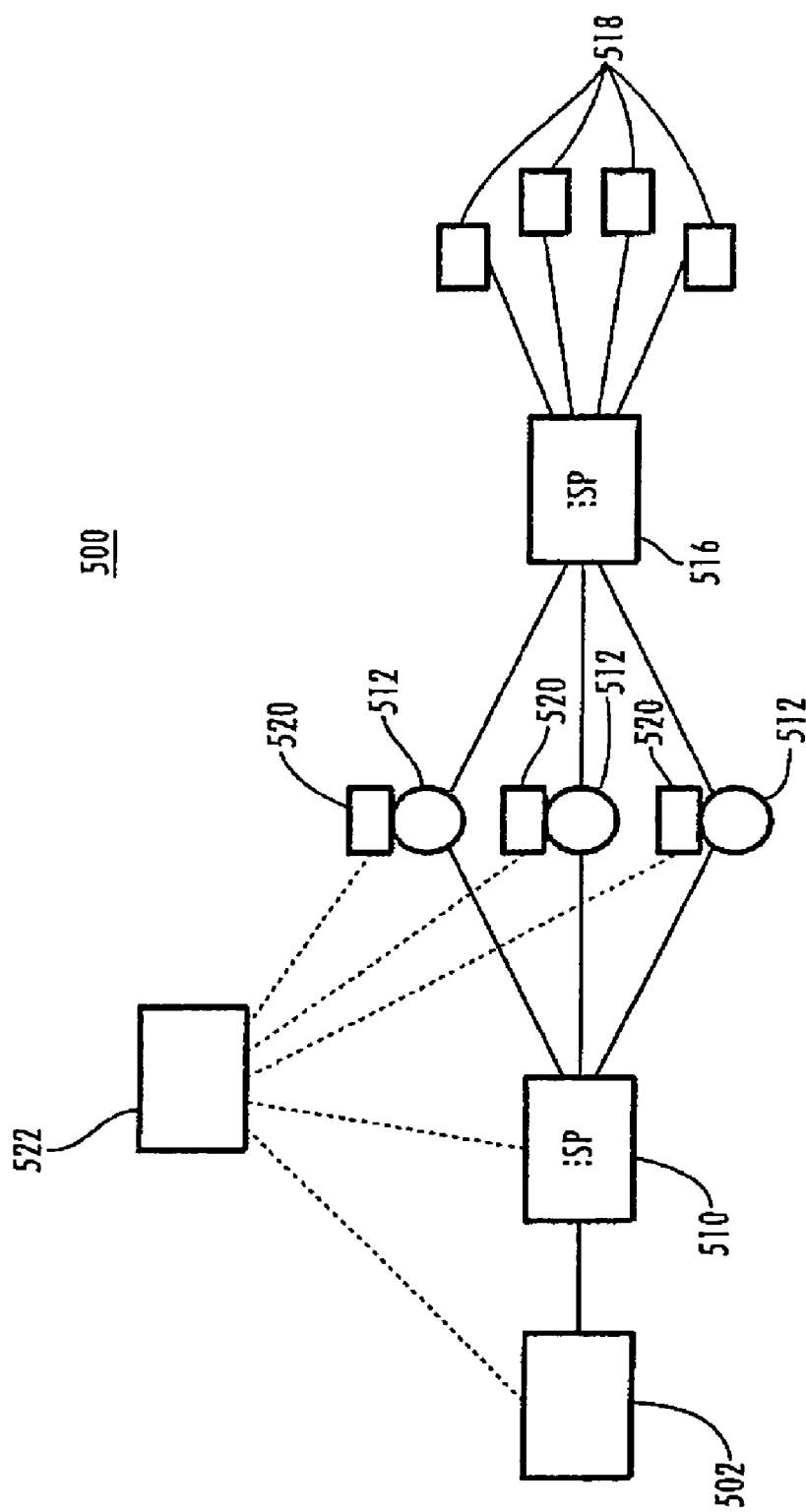
FIG. 8 is a schematic diagram of a data transmission network comprising a first network to transmit a digital object from a source node to a destination node and second network to facilitate bidding among intermediaries.

FIG. 8 is a schematic diagram of a data transmission network 500 comprising a first network to transmit a digital object from a source node to a destination node, and second network to facilitate bidding among intermediaries. A source node 502 may be coupled to the data transmission network 500 by an ISP 510. Source node 502 may transmit a digital object to one or more destination nodes 518 through ISP 510, intermediaries 512 and/or ISP 516. For the purpose of illustration, nodes are connected by data links of the first network represented with solid lines and nodes are connected by data links of the second network represented by broken lines. According to a particular embodiment, data links represented by solid lines are capable of transmitting a digital object toward a destination over a corresponding portion of the first network. Also, data links represented by broken lines may be capable of transmitting control messages, such as, for example, bid requests, bids and acceptance messages, between a server 522 and other nodes in the data transmission network 500.

According to an embodiment, source node 502 may transmit bid requests to intermediaries 512 for a service of forwarding a digital object to one or more destination nodes 508 as discussed above. The intermediaries 512 may also respond to such bids for this service as discussed above. In this particular embodiment, however, server 522 may communicate with source node 502, ISP 510 and/or intermediate nodes through data links in the second network to, among other things, transmit bid requests to and/or receive bids from intermediaries 512.

According to an embodiment, an agent process embodiment 520 may execute on one or more intermediaries 512 to communicate with server 522. For example, in a particular embodiment, an instance of agent process embodiment 520 may be executed by logic such as machine-readable instructions capable of executing on a computer system operated by one or more intermediaries 512. Also, intermediaries 512 may comprise out-of-band communication ports which are capable of communicating on the second network that are distinct from communication ports used for forwarding digital objects on the first network. In a particular embodiment, agent process 520 may communicate with server 522 through such out-of-band communications ports.

According to an embodiment, links of the second network may comprise any one of several types of transmission media such as, for example, any of the aforementioned cabling and/or wireless mediums. Again, however, these are merely examples of transmission media that may used for transmitting messages in the second network and claimed subject matter in not limited in these respects. According to a particular embodiment, messages may be transmitted in links of the second network using any one of the aforementioned data link layer protocols, and may be formatted for transmission on the second network according to any one of the aforementioned network protocols. Again, however, these are merely examples of data link and/or network protocols and claimed subject matter is not limited in these respects.

Figure 9:
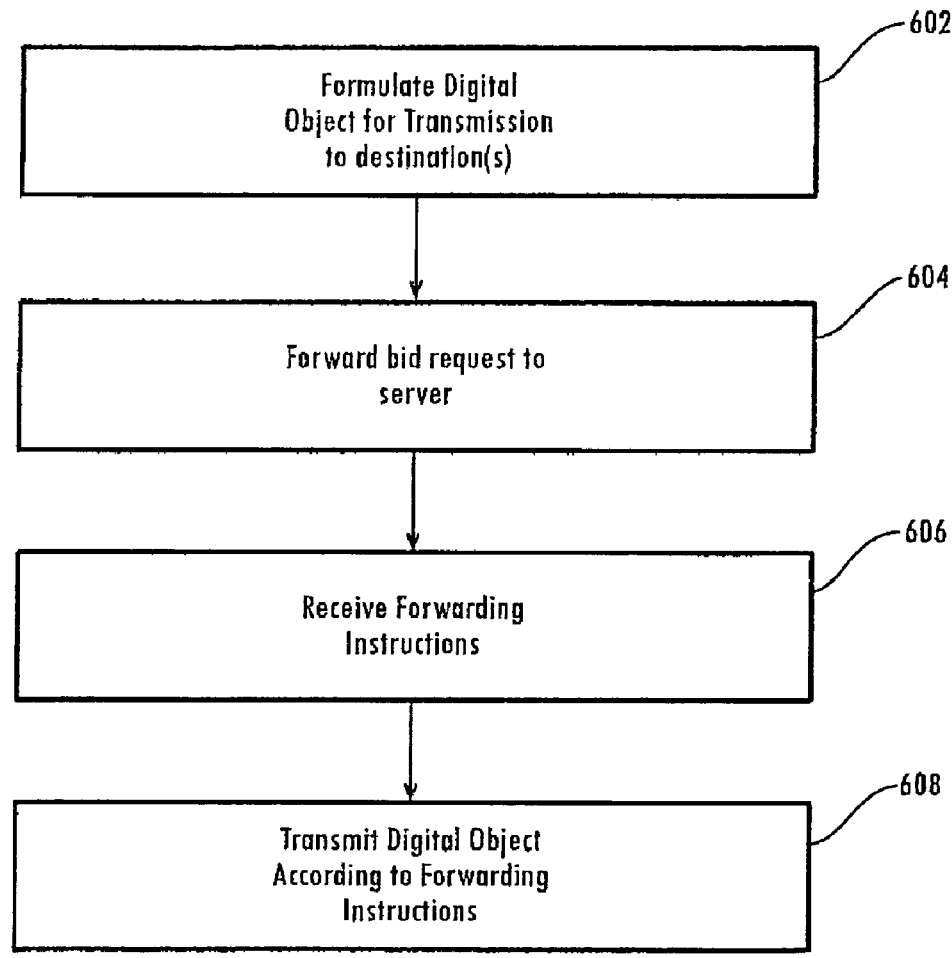
FIG. 9 is a flow diagram illustrating a process to initiate transmission of a digital object to one or more destination nodes according to an embodiment of the data transmission network of FIG. 8.

According to an embodiment, a process of bidding for the service of forwarding a digital object from source node 502 to one or more destination nodes 518 may be governed, at least in part, by server 522 and/or agent process embodiment 520. FIG. 9 is a flow diagram illustrating a process 600 to initiate transmission of a digital object to one or more destination nodes according to an embodiment of data transmission network 500. In a particular embodiment, for example, process embodiment 600 may be performed by logic at the source node 502 and/or ISP 510. At block 602, a digital object may be formulated as illustrated above with reference to block 202 of FIG. 4. However, rather than forwarding bid requests directly to intermediaries, process 600 may forward a bid request to sever 522 (e.g., over the second network). As illustrated below with reference to FIG. 10, server 522 may then facilitate a bidding process among intermediaries 512 for the service of forwarding the digital object to a destination node and selecting an intermediary for forwarding the digital object. Block 606 may receive information (e.g., over the second network) from server 522 which enables forwarding of the digital object to the selected intermediary. For example, block 606 may receive a network address and/or some other identifier associated with a selected intermediary 512 from which the ISP 510 may transmit data packets carrying a digital object to the selected intermediary 512. Block 608 may then initiate transmission of the digital object to a selected intermediary based, at least in part, upon the forwarding instructions received at block 606.

Figure 10:
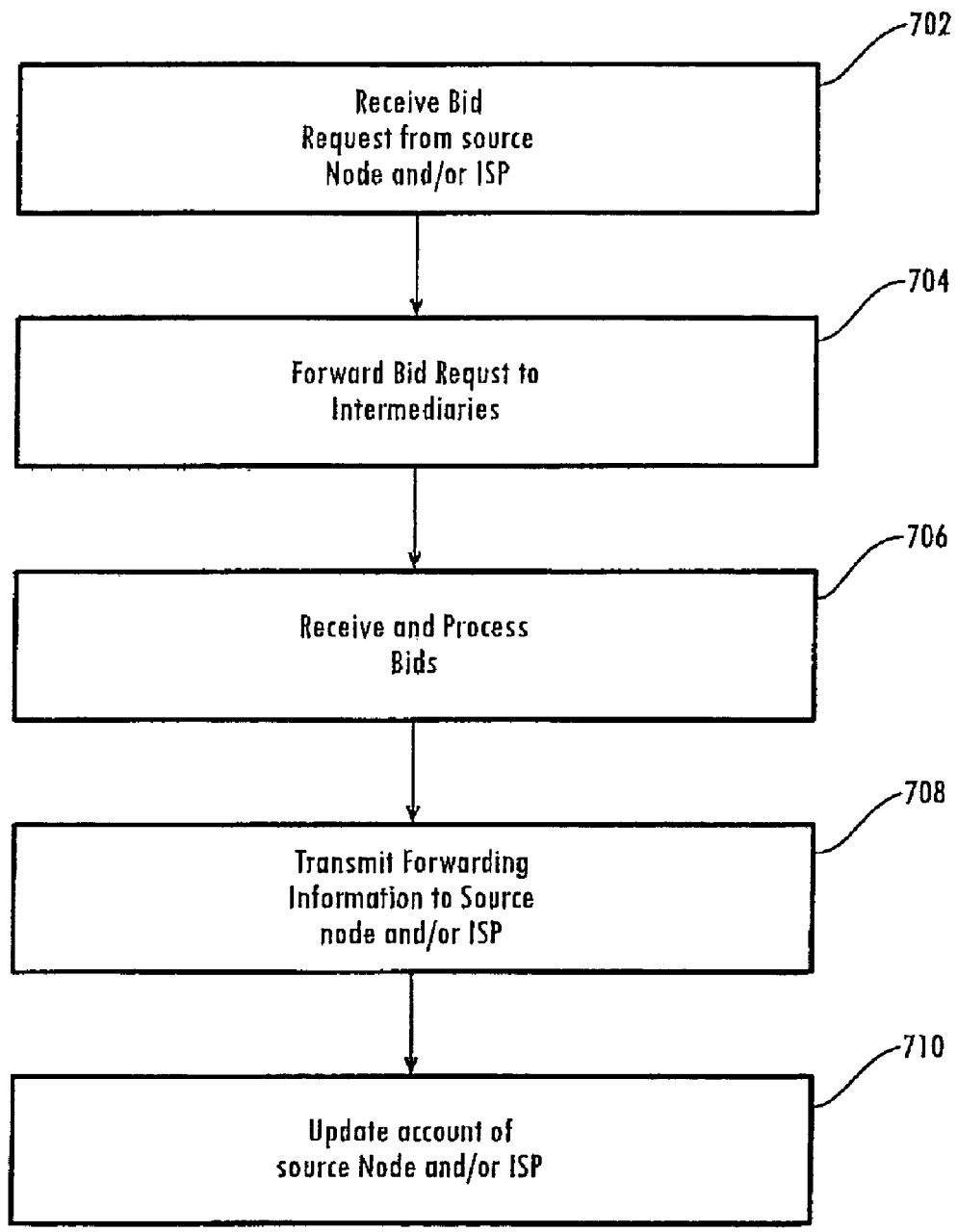
FIG. 10 is a flow diagram illustrating a process to facilitate bidding for the service of forwarding a digital object to one or more destination nodes according to an embodiment of the data transmission network of FIG. 8.

FIG. 10 is a flow diagram illustrating a process embodiment 700 facilitating bidding for the service of forwarding a digital object to one or more destination nodes according to a particular embodiment of a data transmission network of FIG. 8. Block 702 may receive a bid request from source node 502 and/or ISP 510 from the second network (e.g., transmitted at block 604). Block 704 may then broadcast the bid request to one or more intermediaries 512 over the second network. Upon receipt of bid requests from the second network, an instance of agent 520 executing on an associated intermediary may process the bid request and provide a bid as illustrated above with reference to FIG. 5. In this particular embodiment, however, the instance of agent 520 may receive bid requests from, and transmit bids to server 522 over the second network.

In one embodiment, process embodiment 700 may initially identify intermediaries 512 which may be capable of forwarding a digital object to the destination as illustrated above with reference to block 204 (FIG. 4), and limit transmission of bid requests at block 704 to such capable intermediaries 512. Alternatively, process embodiment 700 may merely rely on responses to the bid requests and/or absences of responses to determine the capabilities of the intermediaries 512 as illustrated above.

Upon receiving bids from instances of agent 520, process embodiment 700 may select one or more intermediaries 512 to forward a digital object to one or more destinations, based, at least in part, upon terms set forth in the received bids as illustrated above with reference to block 208 (FIG. 4). Block 708 may then transmit information to be used in forwarding the digital object (e.g., network address(es) of selected intermediary(ies)) over the second network to source node 502 and/or ISP 510 based, at least in part, on the one or more selected intermediaries.

According to an embodiment, server 522 and/or agent process embodiment 520 may maintain billing information for client source nodes and/or ISPs. For example, server 522 may maintain an account of charges owed to intermediaries for forwarding digital objects which have accrued as a result of the bidding process described above or otherwise. In a particular embodiment, block 710 may update the account of source node 502 and/or ISP 510 according to terms of a bid provided by the intermediary 512 selected to forward the digital object to the destination node. For example, server 522 may associate charges with an account number provided in a field of a DTF as part of a bid request received at block 702. However, this is merely an example of maintaining and/or updating an account for charges accrued for the forwarding of digital objects and claimed subject matter is not limited in these respects.

In another particular embodiment, server 522 may coordinate periodic invoicing of accrued charges to nodes that have used the services of intermediaries in forwarding objects in the data transmission network. Server 522 may also facilitate connection charges and/or payment to intermediaries having performed the services of forwarding the digital objects. In one embodiment, server 522 may maintain credit accounts for parties (e.g., source nodes and/or ISPs) that may employ the services of intermediaries in forwarding digital objects. Here, server 522 may charge payment to intermediaries for services performed for parties against the parties' credit accounts. However, these are merely examples of how server 522 may coordinate period invoicing for services performed by intermediaries and claimed subject matter is not limited in these respects.

As illustrated in FIG. 3 above, a source node may forward a digital object to multiple destination nodes over multiple paths. A first intermediary may be selected for forwarding the digital object to one or more destination nodes over a first path and a second intermediary may be selected for transmitting the digital object to one or more other destination nodes over a second path. It should be apparent that the embodiments of FIG. 8 through 10 may facilitate bidding among intermediaries for the service of forwarding the digital object in multiple paths to multiple destinations. Here, server 522 may provide information for forwarding the digital object at block 708 to two or more intermediaries corresponding to the multiple paths.

FIGS. 6 and 7 above illustrate a method and/or system for the transmission of a digital object to a destination node by forwarding the digital object over two or more intermediaries. Here, according to a particular embodiment, the second network may couple server 522 to a source node and/or ISP as well as intermediaries capable of receiving a digital object from the ISP. In response to bid requests from server 522, instances of agent 520 (executing on the intermediaries coupled to the second network) may obtain bids from one or more downstream intermediaries (not shown). Instances of agent 520 may then determine terms for bids for the service of forwarding the digital object to the destination node as illustrated above in process embodiment 450 and transmit the bids to server 522 over the second network. Upon acceptance of one or more of the bids, server 522 may transmit one or more acceptance messages to one or more instances of agent 520 over the second network. Alternatively, as illustrated above, an acceptance may be implied upon receipt of one or more data packets at an intermediary carrying all or a portion of the digital object. Upon an indication of such an acceptance (explicit and/or implied), an instance of agent 520 may accept one or more of said bids received from one or more downstream intermediaries as illustrated above.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that claimed subject matter may also include all embodiments falling within the scope of claimed subject matter, and equivalents thereof.

What is claimed is:

1. A method comprising:
   receiving from a first node within a computer network a first bid request to forward a specified digital object to a destination node via the computer network, wherein the first bid request is received by a second node that is an intermediary node within the computer network and that includes a computer system;

generating, at the second node, a second bid request to forward the specified digital object to the destination node via the computer network, wherein the second bid request is generated based, at least in part, on the first bid request;

transmitting the second bid request from the second node to one or more nodes downstream to the second node, including a third node that is another intermediary node within the computer network;

receiving, at the second node, a set of one or more bids that are responsive to the second bid request, wherein at least a first bid of the set of one or more bids is for forwarding the specified digital object from the second node to the destination node via the third node, wherein the first bid has been generated by the third node based, at least in part, on bid requests successively forwarded from the third node to nodes within the computer network, and on one or more bids received by the third node in response to the successively forwarded bid requests;

the second node computer system generating a second bid based, at least in part, on information in the first bid, wherein the generated second bid is responsive to the first bid request and is for forwarding the specified digital object from the first node to the destination node; and transmitting the generated second bid from the second node to the first node.

2. The method of claim 1, further comprising identifying the one or more nodes downstream to the second node as capable of forwarding the specified digital object to a destination node, wherein said identifying is performed by the second node.

3. The method of claim 1, further comprising:
receiving, at the second node, a message indicative of the acceptance of the transmitted second bid; and
transmitting, from the second node, a message to one or more selected ones of the nodes downstream to the second node to accept at least one of the received set of one or more bids.

4. The method of claim 1, wherein the first node is a source node.

5. The method of claim 1, further comprising:
subsequent to an acceptance of the transmitted second bid, receiving the specified digital object at the second node; and
forwarding the specified digital object from the second node to at least one of the one or more nodes downstream to the second node according to the transmitted second bid.

6. The method of claim 5, wherein forwarding the specified digital object to at least one of the one or more nodes downstream to the second node further comprises:
formatting the specified digital object into one or more data packets;
associating the one or more data packets with a switch label; and
forwarding one or more of the data packets to a label switch router.

7. The method of claim 1, wherein the received set of one or more bids include price terms.

8. The method of claim 1, wherein the bid requests successively forwarded from the third node include a bid request sent to a fourth node, and wherein the fourth node has not directly received a bid request to forward the specified digital object from the second node.

9. The method of claim 1, wherein the first bid request is received from an Internet service provider.

10. The method of claim 1, wherein the first bid request is received from an intermediary node employing multiprotocol label switching (MPLS).

11. An apparatus comprising:
means for receiving from a first node within a computer network a first bid request to forward a specified digital object to a destination node via the computer network;
means for transmitting a second bid request from the apparatus to one or more nodes downstream to the apparatus, including a third node that is an intermediary node within the computer network, wherein the second bid request is to forward the specified digital object to the destination node and is based, at least in part, on the first bid request;
means for receiving a set of one or more bids that are responsive to the second bid request, wherein at least a first bid of the set of one or more bids is for forwarding the specified digital object from the apparatus to the destination node via the third node, wherein the first bid has been generated by the third node based, at least in part, on bid requests successively forwarded from the third node to nodes within the computer network, and on one or more bids received by the third node in response to the successively forwarded bid requests; and
means for transmitting a second bid to the first node, wherein the transmitted second bid is generated based, at least in part, on information in the first bid, wherein the generated second bid is responsive to the first bid request and is for forwarding the specified digital object from the first node to the destination node.

12. The apparatus of claim 11, further comprising means for identifying one or more intermediary nodes as capable of forwarding the specified digital object to the destination node.

13. The apparatus of claim 11, wherein the first node is a source node.

14. The apparatus of claim 11, further comprising means for receiving an indication of the acceptance of the transmitted second bid by the first node.

15. The apparatus of claim 14, wherein the first node is an intermediary.

16. The apparatus of claim 14, further comprising means for transmitting an acceptance message to at least one of the one or more nodes downstream to the apparatus in response to an indication of the acceptance of the transmitted second bid by the first node.

17. An article of manufacture including a non-transitory computer-readable storage medium having instructions stored thereon that are executable by a computing device to cause the computing device to perform operations comprising:
receiving from a first node a first bid request to forward a specified digital object to a destination node, wherein the first bid request is received by a second node that includes the computing device;
generating a second bid request to forward the specified digital object to the destination node, wherein the second bid request is generated based, at least in part, on the first bid request;
transmitting the second bid request to one or more intermediary nodes including a third node;
receiving a set of one or more bids from the one or more intermediary nodes that are responsive to the second bid request, wherein at least a first bid of the set of one or more bids is for forwarding the specified digital object from the computing device to the destination node via the third node, wherein the first bid has been generated by the third node based, at least in part, on bid requests successively forwarded from the third node to other nodes, and on one or more bids received by the third node in response to the successively forwarded bid requests;

generating a second bid based, at least in part, on information included in the first bid, wherein the generated second bid is responsive to the first bid request and is for forwarding the specified digital object from the first node to the destination node; and transmitting the generated second bid to the first node.

18. The article of manufacture of claim 17, wherein the operations further include identifying the one or more intermediary nodes as capable of forwarding the specified digital object.

19. The article of manufacture of claim 17, wherein the operations further include receiving a message indicative of an acceptance of the transmitted second bid.

20. The article of manufacture of claim 17, wherein the first node is a source node and the one or more intermediary nodes do not include at least one destination node for a transmission of the specified digital object from a source node.

21. The article of manufacture of claim 17, wherein the operations further include:
    formatting the specified digital object into one or more data packets;
    associating the one or more data packets with a switch label; and
    forwarding one or more of the data packets to a label switch router.

22. The article of manufacture of claim 17, wherein the first bid request is received from an intermediary node employing multiprotocol label switching (MPLS).

23. The article of manufacture of claim 17, wherein the operations further include transmitting an acceptance message to at least one of the one or more intermediary nodes in response to the indication of acceptance of the transmitted bid.

24. The article of manufacture of claim 17, wherein one or more terms expressed in the received set of one or more bids include a price term.

25. A computer system, comprising:
    a processor; and
    a memory configured to couple to the processor, wherein the memory has stored thereon instructions executable by the processor to cause the computer system to perform operations comprising:
        receiving, from a first node, a first bid request to forward a particular digital object to a destination node via a data transmission network;
        generating, a second bid request to forward the particular digital object to the destination node via the data transmission network, wherein the second bid request is generated based, at least in part, on the first bid request;
        transmitting the second bid request to one or more intermediary nodes including a third node;
        receiving a set of one or more bids that are responsive to the second bid request, wherein at least a first bid of the set of one or more bids is for forwarding the particular digital object from the computer system to the destination node via the third node, wherein the first bid has been generated by the third node based, at least in part, on bid requests successively forwarded from the third node to other nodes within the data transmission network, and on one or more bids received by the third node in response to the successively forwarded bid requests;
        generating a second bid to forward the particular digital object based, at least in part, on information in the first bid, wherein the generated second bid is responsive to the first bid request and is for forwarding the particular digital object from the first node to the destination node; and
        transmitting the generated bid to the first node.

26. The computer system of claim 25, wherein the computer system is further configured to identify the one or more intermediary nodes as capable of forwarding the particular digital object;
    wherein the first node from which the first bid request is received is a source node; and
    wherein the computer system is an intermediary node.

27. The computer system of claim 25, wherein the computer system is further configured to:
    receive from the first node a first message indicative of an acceptance of the transmitted second bid by the first node; and
    transmit a second message to one or more selected ones of the intermediary nodes in response to receiving the first message, wherein the second message is indicative of the computer system accepting at least one of the received set of one or more bids.

28. The computer system of claim 25, further comprising a label switch router configured to:
    receive the particular digital object from the first node; and
    forward the particular digital object to at least one of the one or more intermediary nodes.

29. The computer system of claim 25, further comprising a label switch router configured to:
    receive the particular digital object as one or more data packets; and
    forward one or more of the data packets to a downstream label switch router.

30. The computer system of claim 25, wherein the computer system is controlled by an Internet service provider.

31. The computer system of claim 25, wherein the computer system is an intermediary node and is further configured to forward the particular digital object to a plurality of other nodes based, at least in part, on an indication of acceptance of the transmitted second bid received from the first node.

32. The computer system of claim 25, wherein the computer system is further configured to transmit an acceptance message to at least one of the one or more intermediary nodes in response to an indication of acceptance of the transmitted second bid received from the first node.

33. The computer system of claim 25, wherein one or more terms expressed in the received set of one or more bids includes an expected delivery time for the particular digital object.

* * * * *

UNITED STATES PATENT AND TRADEMARK OFFICE
CERTIFICATE OF CORRECTION

PATENT NO. : 8,194,701 B2
APPLICATION NO. : 11/296828
DATED : June 5, 2012
INVENTOR(S) : Khan et al.

Page 1 of 1

It is certified that error appears in the above-identified patent and that said Letters Patent is hereby corrected as shown below:

In Fig. 8, Sheet 6 of 8, for Tag "516", delete " 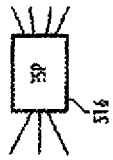 " and insert -- 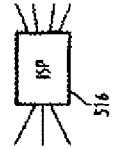 --, therefor.

In Fig. 8, Sheet 6 of 8, for Tag "510", delete " 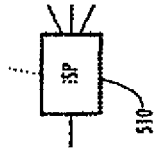 " and insert -- 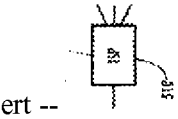 --, therefor.

In Fig. 10, Sheet 8 of 8, for Tag "704", in Line 1, delete "Requst" and insert -- Request --, therefor.

In Column 1, Line 36, delete "is" and insert -- is a --, therefor.

In Column 7, Line 13, delete "Sychronous" and insert -- Synchronous --, therefor.

In Column 14, Line 2, delete "intiate" and insert -- initiate --, therefor.

Signed and Sealed this
Twenty-third Day of October, 2012

David J. Kappos
*Director of the United States Patent and Trademark Office*